(12) United States Patent
Roggero et al.

(10) Patent No.: US 6,662,109 B2
(45) Date of Patent: Dec. 9, 2003

(54) METHOD OF CONSTRAINING BY DYNAMIC PRODUCTION DATA A FINE MODEL REPRESENTATIVE OF THE DISTRIBUTION IN THE RESERVOIR OF A PHYSICAL QUANTITY CHARACTERISTIC OF THE SUBSOIL STRUCTURE

(75) Inventors: Frédéric Roggero, Pau (FR); Mokhles Mezghani, Rueil Malmaison (FR)

(73) Assignee: Institut Francais du Petrole, Rueil Malmaison cedex (FR)

( * ) Notice: Subject to any disclaimer, the term of this patent is extended or adjusted under 35 U.S.C. 154(b) by 0 days.

(21) Appl. No.: 10/124,392

(22) Filed: Apr. 18, 2002

(65) Prior Publication Data

US 2003/0028325 A1 Feb. 6, 2003

(30) Foreign Application Priority Data

Apr. 19, 2001 (FR) .............................. 01 05339

(51) Int. Cl.$^7$ ................................. G01V 9/00
(52) U.S. Cl. .............................. 702/6; 703/5
(58) Field of Search ............... 702/2, 10, 6; 367/73; 703/10, 5

(56) References Cited

U.S. PATENT DOCUMENTS 5,764,515 A * 6/1998 Guerillot et al. ................ 702/2
6,388,947 B1 * 5/2002 Washbourne et al. .......... 367/73

FOREIGN PATENT DOCUMENTS

| FR | 2734069 | * 12/1995 | ........... G06F/19/00 |
| FR | 2780798 | * 1/1998 | ........... G06F/17/00 |
| FR | 2795841 | 1/2001 | ........... G06F/17/00 |
| WO | WO/48022 | 8/2000 | ........... G01V/11/00 |

OTHER PUBLICATIONS

Tran T., Wen X., Behrens, R.: "Efficient Conditioning of 3D Fine–Scale Reservoir Model to Multiphase Production Data Using Streamline–Based Coarse–Scale Inversion and Geostatistical Downscaling" Society of Petroleum Engineers, Oct. 3, 1999, pp. 1–13, XP002186718.

Durlofsky. L., Behrens R., Jones, R., Bernath A.: "Scale Up To Heterogeneous Three Dimensional Reservoir Descriptions" Society of Petroleum Engineers, Oct. 22, 1995, pp. 313–326, XP002186719, pp. 313–326.

Roggero, F., Hu, L.: "Gradual Deformation of Continuous Geostatistical Models For History Matching", Society of Petroleum Engineers, Sep. 27, 1998, pp. 221–236.

Anterion et al., Use of Parameter Gradients for Reservoir History Matching, Society of Petroleum Engineers, SPE 18433, Copyright 1989, pp. 339–354.

(List continued on next page.)

*Primary Examiner*—John Barlow
*Assistant Examiner*—Victor J. Taylor
(74) *Attorney, Agent, or Firm*—Antonelli, Terry, Stout & Kraus, LLP

(57) ABSTRACT

The invention is a method for direct updating, by dynamic production data, of a fine geologic model representative of the distribution, in a reservoir, of a physical quantity characteristic of the subsoil structure. The method couples inversion and upscaling techniques allowing optimization of petrophysical parameters of a rougher simulation model resulting from the fine geologic model. Direct parameterization of the fine geologic model is performed followed by upscaling only as a means of obtaining rapidly an approximation of simulation results and of derivatives thereof in relation to the parameterization of the fine geologic model. The model has applications for determination of a development scheme such as optimizing the production of a hydrocarbon reservoir.

37 Claims, 30 Drawing Sheets

OTHER PUBLICATIONS

Chu, et al. Computation of Sensitivity Coefficients With Application to the Integration of Static and Well–Test Pressure Data, Eclipse International Forum, Milan, Italy, Sep. 6–9, 1994, pp. 1–22, 15 drawings.

Renard et al., Calculating equivalent permeability: a review, Advances in Water Resources, vol. 20, Nos. 5–6, pp. 253–278, 1997.

Wen et al., High Resolution Reservoir Models Integrating Multiple–Well Production Data, Society of Petroleum Engineers, SPE 38728, Copyright 1997, pp. 115–129.

Hu et al., Constraining A Reservoir Facies Model To Dynamic Data Using A Gradual Deformation Method, $6^{th}$ European Conference on the Mathematics of Oil Recovery, Peebles—Scotland, Sep. 8–11, 1998, 7 pages.

* cited by examiner

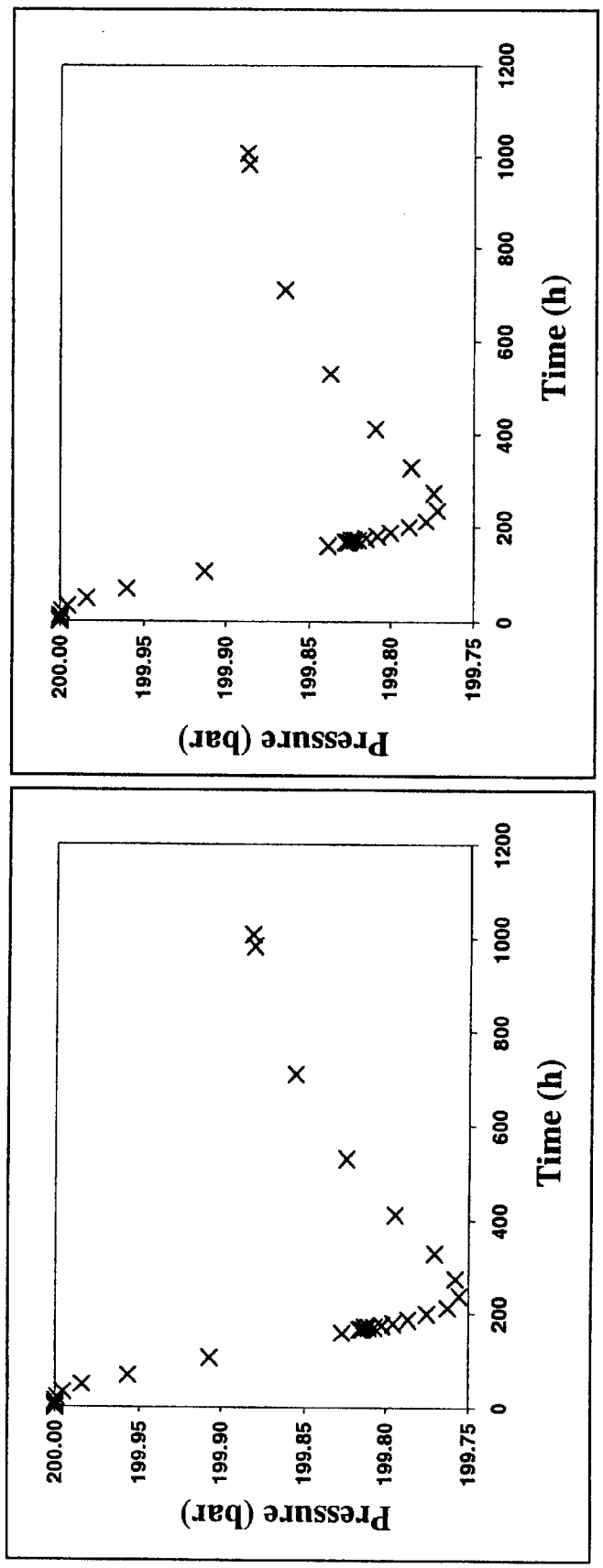

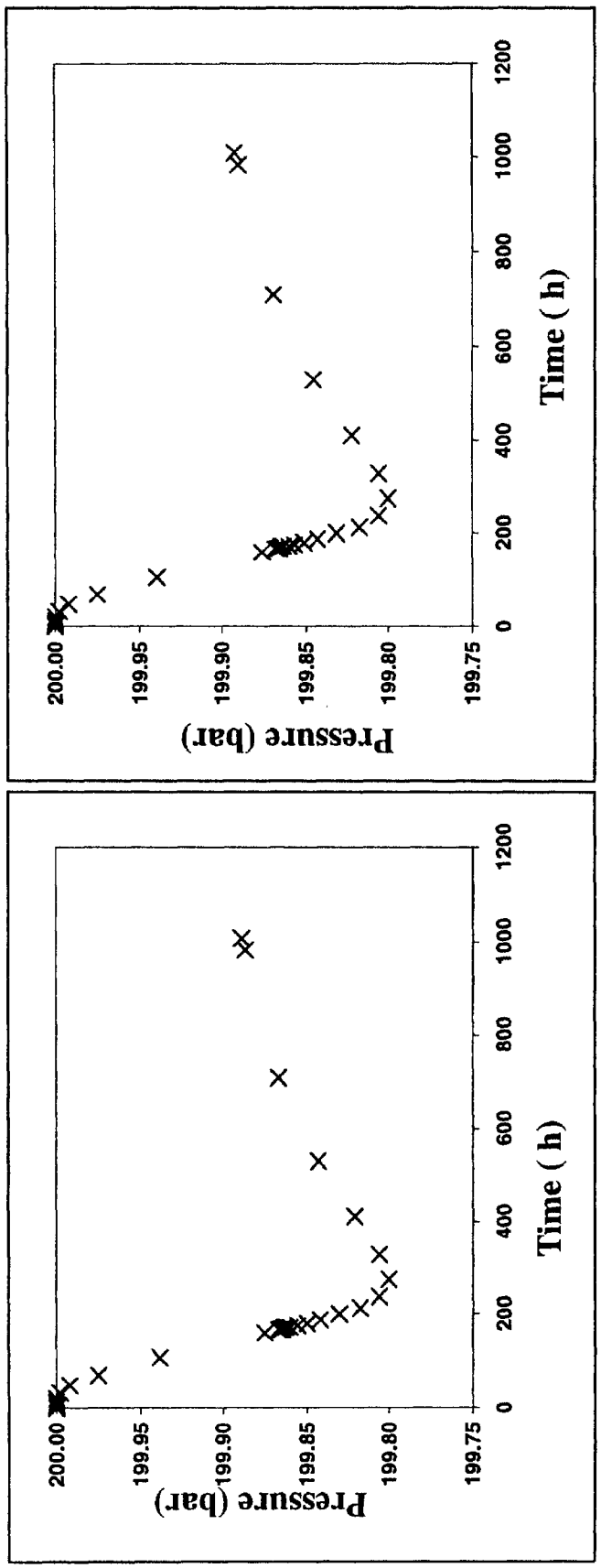

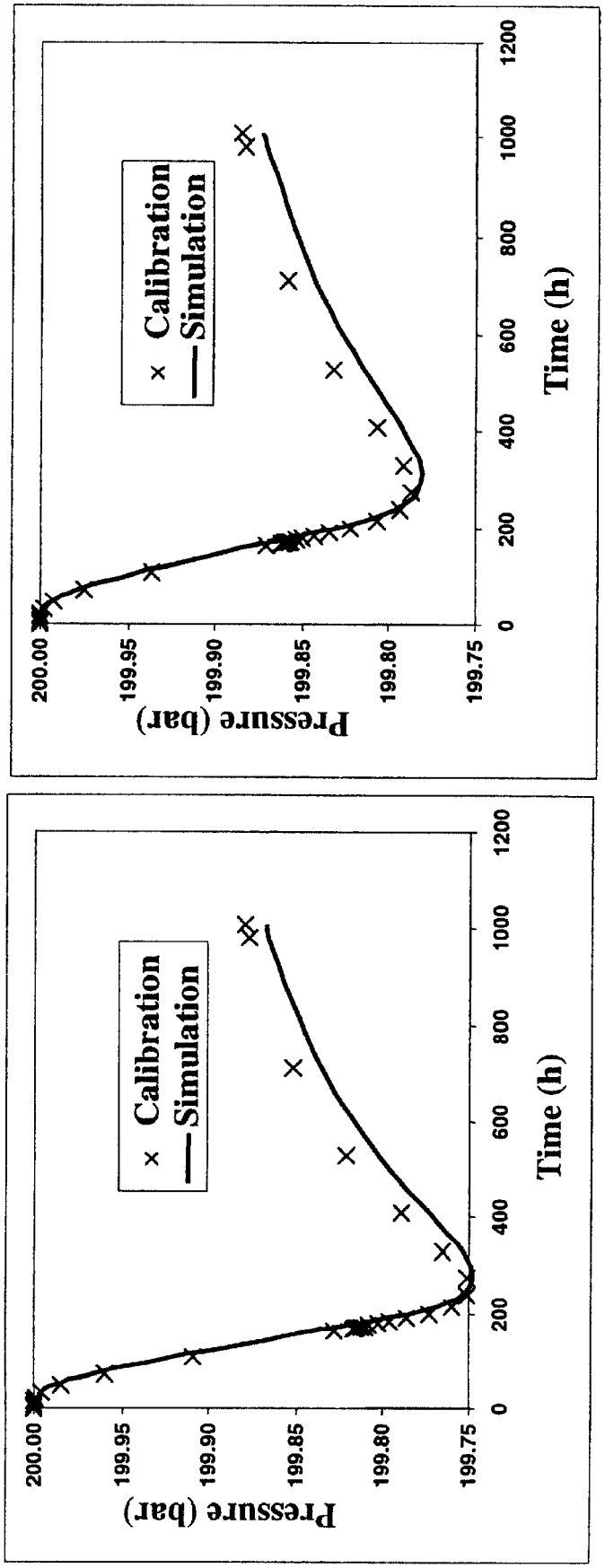

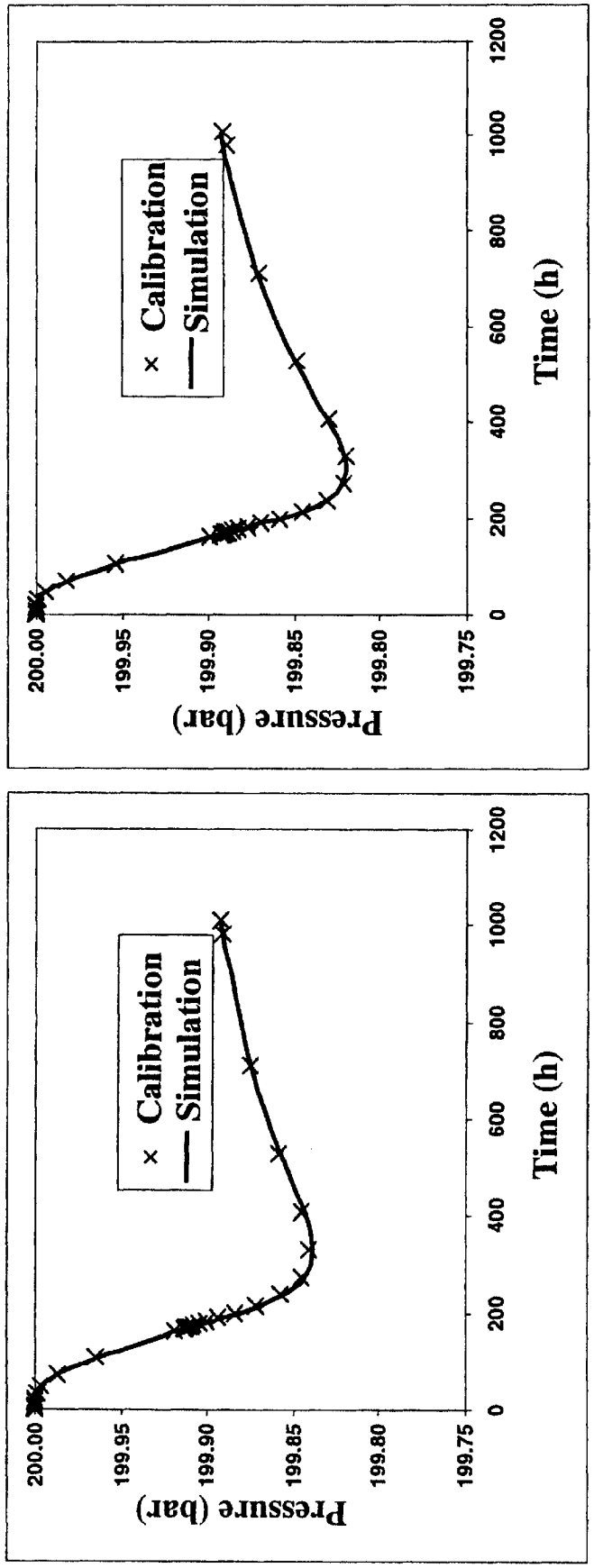

FIG.17

| | Fine model | Coarse model |
|---|---|---|
| One simulation | 180 mn | 3 mn |
| One gradient | 180 mn | 3 mn |
| # Gradients - Calibration | 0 | 2 |
| # Iterations - Calibration | 0 | 5 |
| CPU time - Calibration | 0 mn | 180+45=225 mn |
| # Gradients - Matching | 5 | 5 |
| # Iterations - Matching | 21 | 21 |
| CPU time - Matching | 180x21=22680 mn | 3x21=378 mn |
| Total CPU time | 0+22680=22680 mn | 225+378=603 mn |

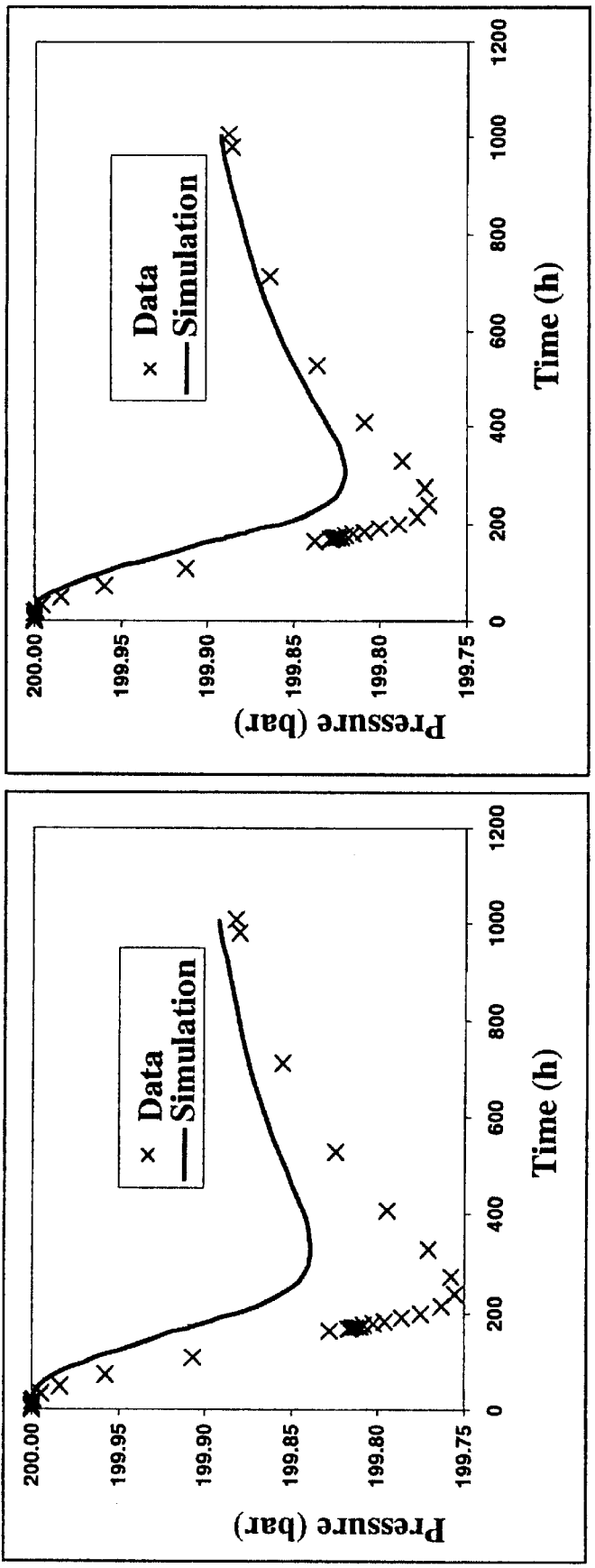

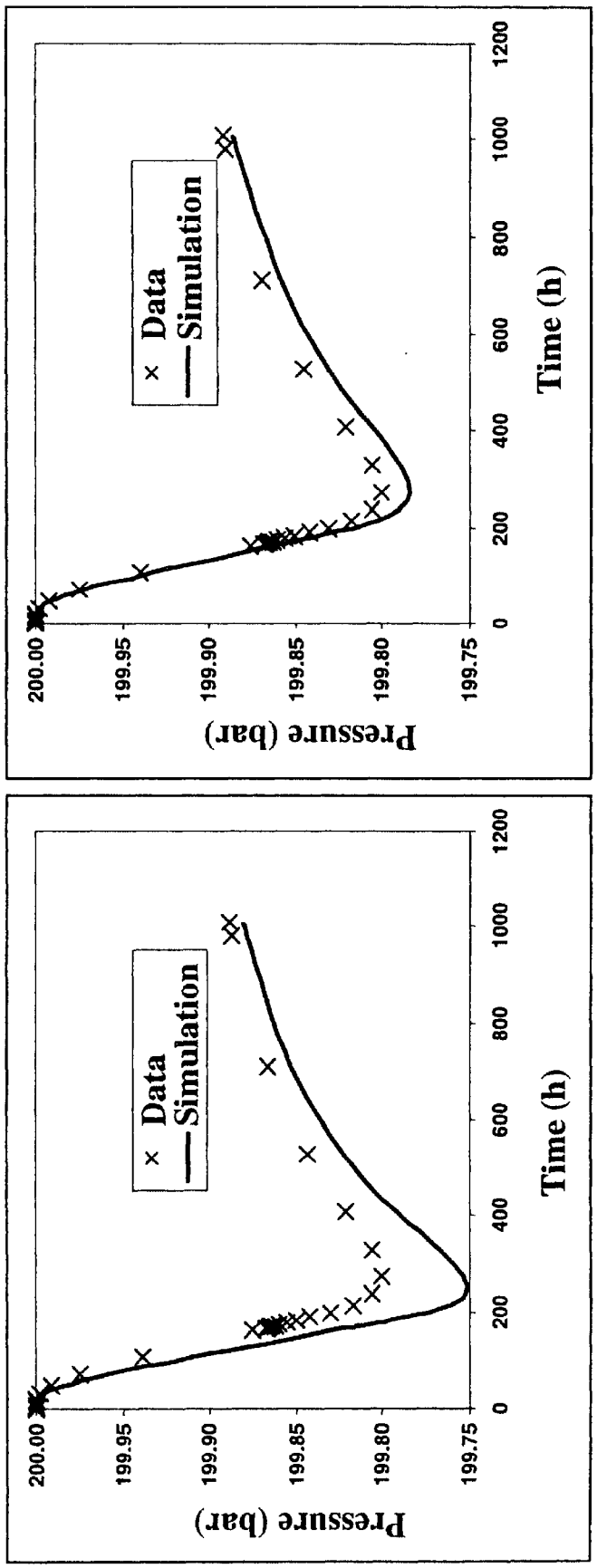

METHOD OF CONSTRAINING BY DYNAMIC PRODUCTION DATA A FINE MODEL REPRESENTATIVE OF THE DISTRIBUTION IN THE RESERVOIR OF A PHYSICAL QUANTITY CHARACTERISTIC OF THE SUBSOIL STRUCTURE

BACKGROUND OF THE INVENTION

1. Field of the Invention

The present invention relates to a method of constraining by dynamic production data a fine geologic model representative of the distribution, in a heterogeneous reservoir, of a physical quantity characteristic of the subsoil structure, such as permeability or porosity.

2. Description of the Prior Art

The prior art to which reference is made hereafter is described in the following publications:

Wen, X.-H., et al.: "Upscaling hydraulic conductivities in heterogeneous media: An overview. Journal of Hydrology (183)", ix–xxxii, 1996;

Renard, P.: "Modélisation des écoulements en milieux poreux hétérogénes: calcul des perméabilités équivalentes". Thése, Ecole des Mines de Paris, Paris, 1999;

G. de Marsily: "De l'identification des systemes hydrologiques". Thése, Université Paris 6, Paris, 1976;

Hu L.-Y. et al.: "Constraining a Reservoir Facies Model to Dynamic Data Using a Gradual Deformation Method", VI European Conference on the Mathematics of Oil Recovery, Peebles, 1998;

Tarantola, A.: "Inverse Problem Theory: Method for Data Fitting and Model Parameter Estimation". Elsevier, Amsterdam, 1987;

Anterion F. et al.: "Use of Parameter Gradients for Reservoir History Matching", SPE 18433, Symposium on Reservoir Simulation of the Society of Petroleum Engineers, Houston, 1989;

Wen X.-H. et al.: "High Resolution Reservoir Models Integrating Multiple-Well Production Data", SPE 38728, Annual Technical Conference and Exhibition of the Society of Petroleum Engineers, San Antonio, 1997;

Chu L. et al. : "Computation of Sensitivity Coefficients With Application to the Integration of Static and Well Test Pressure Data", Eclipse International Forum, Milan, 1994.

Numerical simulations of flow models are widely used in the petroleum industry to develop a reservoir and to predict its dynamic behavior according to various production scenarios. The geostatistical models used to represent the geologic structure of the reservoir (permeability, porosity, etc.) require an identification of a large number of grid cells that can reach about ten millions.

To be able to carry out numerical flow simulations within reasonable computing times, common practice consists in constructing a rough simulation model by grouping together grids with different properties into macrogrids and by assigning to the macrogrids an equivalent property calculated from the local properties. This operation is referred to as upscaling.

The aim of constrained reservoir characterization is to determine the parameters of the simulation model so that the latter can reproduce the production data of the reservoir to be modelled. This parameter estimation stage is also referred to as production data fitting. The flow simulation model is thus compatible with all of the available static and dynamic data.

In common practice, the parameters of the simulation model are estimated by means of a series of trials and errors using the flow simulator.

The problem of production data fitting can also be formulated as a problem of minimizing an objective function measuring the difference between the production data observed in the field and the predictions provided by the flow simulator. Minimizing is then carried out using optimization or optimum control techniques.

A method of predicting, by means of an inversion technique, the evolution of the production of an underground reservoir, notably of a reservoir containing hydrocarbons, is for example described in U.S. Pat. No. 5,764,515 filed by the assignee.

As soon as the parameters of the simulation model are adjusted, this model can be used to simulate the present and future behavior of the reservoir. An evaluation of the in-situ reserves is thus available and a development scheme optimizing the production can be determined.

Constrained reservoir characterization thus involves multiple techniques, from geostatistical modeling to optimization problems. The introduction of the main techniques used within the scope of the "inversion and upscaling" coupling methodology is dealt with in the section hereafter.

Geostatistical Modelling

Geostatistics, in its probabilistic presentation, implies that a spatial variable such as the permeability, for example, can be interpreted as a particular realization of a random function, defined by its probability law at any point in space. The increasingly common use of geostatistics by oil companies leads to the construction of fine models that can reach a large number of grid cells, In fact, geostatistics allows estimation of petrophysical properties in space from local measurements. Strictly speaking, realization of the geostatistical model has to be carried out on the scale of the measurement support, and the model thus obtained can then reach several million grid cells. Numerical flow simulation on the scale of the geostatistical model is not conceivable with the power of current computers. In order to reduce the number of grids, the grids have to be grouped together, which requires computation of the equivalent properties of the new grids as a function of the properties of the small-scale grids. This operation is referred to as upscaling.

Upscaling

Computation of the equivalent permeability of heterogeneous porous media has been widely studied by the community of geologists, reservoir engineers and more generally of porous media physicists.

From a mathematical point of view, the process of upscaling each directional permeability can be represented by the vectorial operator F defined by:

$$F: R^m \to R^M k \to K \tag{1}$$

k: the permeability on the scale of the geostatistical model (dimension $R^m$); K:the permeability on the scale of the flow simulation model (dimension $R^M$).

Wen et al. (1997) and Renard (1999), mentioned above, gave a review of the existing techniques from the prior art. Examples of known upscaling techniques are algebraic methods which involve simple analytical rules for plausible calculation of the equivalent permeabilities without solving a flow problem. The known method referred to as "power average" technique can be selected for example. The permeability K of block $\Omega$ is equal to a power average, also called average of order$^w$, whose exponent$^w$ ranges between $-1$ and $+1$:

$$K(w) = \left(\frac{1}{mes(\Omega)} \int_\Omega k^w d\Omega\right)^{1/w} \quad (2)$$

The problem of the equivalent permeability calculation thus comes down to the estimation of the exponent w allowing minimization of the error induced by upscaling (defined according to a certain criterion). For media with an isotropic log-normal distribution and a low correlation length, it is well-known that:

$$w = 1 - \frac{2}{\alpha} \quad (3)$$

$\alpha$ being the dimension in space ($\alpha=1$, 2 or 3).

There are also known numerical upscaling techniques wherein calculation of the equivalent permeability involves solving the pressure p and velocity v fields of a local or global flow problem:

$$\begin{cases} -\frac{k}{\mu} \nabla p = v \text{ dans } \Omega \\ div(v) = 0 \text{ dans } \Omega \end{cases} \quad (4)$$

$\mu$ denotes the viscosity of the flowing fluid.

Parameterization

The problem of geologic model updating by means of dynamic data is based on the solution of an inverse problem. This naturally poses the problem of the parameterization of the permeability field in order to allow minimization of the objective function which measures the difference (in the sense of the least squares) between the dynamic data observed in the field and the simulation results.

Parameterization of geostatistical models is a fundamental point which guarantees the success of the integration of the dynamic data into the geologic models. In fact, this integration is carried out according to an iterative procedure governed by the optimization process and disturbs an initial permeability field representative of the geostatistical model considered.

Ideally, the final permeability field must not only respect all the dynamic data taken into account in the objective function, but also must preserve the geostatistical coherence of the model (average, variogram, etc.). Observance of the dynamic data is controlled by the objective function whose value is an evaluation of the data fitting quality. Concerning the coherence of the geostatistical data, it is the parameterization of the permeability field that allows control thereof.

A known technique allowing this parameterization to be carried out is the pilot point method, which is based on the principle of the conditional geostatistical simulation applied to the Gaussian type models, described for example by de Marsily (1976) as mentioned above.

Another known technique allowing this parameterization to be carried out is the gradual deformation method. As described by Hu et al. (1998), as well as in French patents 2,780,798 and 2,795,841 and in French patent application EN-01/03,194 filed by the assignee, the gradual deformation method writes a new realization of the permeability field to be estimated, assumed to be of Gaussian type which is a linear combination of realizations independent of the random function modeling the permeability field. Permeability field k is therefore given by:

$$k(\theta) = \sum_{i=1}^{n} \theta_i k_i \quad (5)$$

$(\theta_i)_{1 \leq i \leq n}$: the coefficients of the linear combination, and
$(k_i)_{1 \leq i \leq n}$: the independent realizations of the geostatistical model considered.

In order to preserve the geostatistical properties of the model, coefficients $\theta$ must meet the normality constraint as follows:

$$\sum_{i=1}^{n} \theta_i^2 = 1 \quad (6)$$

Coefficients $\theta$ are estimated so that the resulting permeability field $k(\theta)$ best reproduces the dynamic data.

Unlike the pilot point method, the gradual deformation method can be applied locally or globally. Strict observance of the geostatistical properties of the model is guaranteed by respecting the normality constraint (Equation 6) without introducing an a priori model in the objective function.

Objective Function

Updating a geologic model with dynamic data is based on the minimization of an objective function which measures the difference between the dynamic data observed in the field and the simulation results obtained for a set value of parameters $\theta$.

Several formulations are possible to define an objective function. The formulation in the sense of the least squares is the most commonly used in the petroleum field. The objective function is thus expressed as follows:

$$J_1(\theta) = \frac{1}{2}(d^{obs} - D(\theta))^T C_d^{-1}(d^{obs} - D(\theta)) \quad (7)$$

with:
$d^{obs}$: the dynamic data observed in the field,
$D(\theta)$: the simulation results for the set value of parameters $\theta$,
$C_d$: the covariance matrix on the observations.

As described by Tarantola (1987), a formulation better suited to the solution of improperly expressed inverse problems adds a regularization term (a priori model) in the objective function:

$$J_1(\theta) = \frac{1}{2}(d^{obs} - D(\theta))^T C_d^{-1}(d^{obs} - D(\theta)) + \frac{1}{2}(\theta - \theta^{pri})^T C_\theta^{-1}(\theta - \theta^{pri}) \quad (8)$$

with:
$\theta^{pri}$: a priori estimation of parameters $\theta$,
$C_\theta$: the covariance matrix on the parameters.

The latter formulation of the objective function has a probabilistic interpretation. In fact, in the context of a Bayesian inversion, the a priori model is given by a probability density function of any law.

For an a priori model of Gaussian law, of average $\theta^{pri}$ and of covariance $C_\theta$, this probability density function is written as follows:

$$f_\Theta(\theta) \propto \exp\left\{-\frac{1}{2}(\theta - \theta^{pri})^T C_\theta^{-1}(\theta - \theta^{pri})\right\} \quad (9)$$

In the same context, the probability of obtaining observations $d^{obs}$ knowing the value of parameters $\theta$, or likelihood function, can then be expressed in the following form:

$$f_{D/\Theta}(D = d^{obs}/\theta) \propto \exp\left\{-\frac{1}{2}(d^{obs} - D(\theta))^T C_d^{-1}(d^{obs} - D(\theta))\right\} \quad (10)$$

When the flow simulation operator D is linear in relation to parameters $\theta$, the a posteriori probability density function still is of Gaussian law.

Minimization of objective function $J_1$ requires calculation of the derivatives of the simulation results in relation to the parameters to be estimated, i.e.:

$$\frac{\partial D}{\partial \theta}(\theta) \quad (11)$$

This calculation of the derivatives, essential for carrying out the minimization process under the best conditions, has been the subject of considerable work. A synthesis of the minimization process is given in the aforementioned article by Chu et al. (1994).

To date, two methods are essentially used in the petroleum industry: the numerical gradients and the gradients method. Considering its qualities in terms of numerical stability and rapidity, the gradients method has been selected for the calculation of the simulation result derivatives in relation to the parameterization of the fine geostatistical model.

The use of small letters refers to the fine geostatistical model and the use of capital letters refers to the rough simulation model. By way of example:

k denotes the permeability field on the scale of the geostatistical model, whereas K denotes the permeability field on the scale of the flow simulation model (after upscaling);

d denotes the simulation results obtained from the fine geostatistical model, whereas D denotes the simulation results obtained by means of the rough simulation model (after upscaling).

Calculation of the Derivatives—Gradients Method

The gradients method allows calculation of the derivatives of the results of a numerical flow simulation in relation to a certain number of parameters involved in the simulation model. By way of example, it is possible to calculate the derivatives of the main production results (pressure, saturation, flow rate, etc.) in relation to the petrophysical properties (permeability, porosity, etc.) assigned to zones of the reservoir.

The gradients method is based on the derivation of the defined equations of the flow model as described by Antérion et al. (1989) mentioned above. These defined equations have the form of a system of non-linear equations of the following type:

$$\begin{cases} U^0 = U^{ini} \\ F(\theta, U^n, U^{n+1}) = 0 \end{cases} \quad (12)$$

$\theta$: the parameters to be estimated, $U^{ini}$: initialization of the unknowns to be simulated. This initialization is calculated from the initial conditions of the partial differential equation system modelling the flow, $U^n$: the simulation unknowns calculated at the time $t^n$, $U^{n+1}$: the simulation unknowns calculated at the time $t^{n+1}$.

System (12) is non-linear and is generally solved by means of the Newton method based on successive linearizations of non-linear system (12) as follows:

$$\begin{cases} U^{(0)} = U^n \\ \frac{\partial F}{\partial U^{n+1}}(\theta, U^n, U^{(k)})(U^{(k+1)} - U^{(k)}) = -F(\theta, U^n, U^{(k)}) \end{cases} \quad (13)$$

Calculation of the derivatives of the simulation results in relation to the parameterization $\theta$ is based on the direct derivation of system (12). A new linear system, whose unknowns are the derivatives $\partial U^{n+1}/\partial \theta$, results from this derivation. For each parameter $\theta_i$, this system is expressed in the following form:

$$\begin{cases} \frac{\partial U^0}{\partial \theta_i} = \frac{\partial U^{ini}}{\partial \theta_i} \\ \frac{\partial F}{\partial U^{n+1}}(\theta, U^n, U^{n+1})\frac{\partial U^{n+1}}{\partial \theta_i} + \frac{\partial F}{\partial U^n}(\theta, U^n, U^{n+1})\frac{\partial U^n}{\partial \theta_i} + \frac{\partial F}{\partial \theta_i}(\theta, U^n, U^{n+1}) = 0 \end{cases} \quad (14)$$

The matrix of the linear system is given by the term:

$$\left[\frac{\partial F}{\partial U^{n+1}}(\theta, U^n, U^{n+1})\right] \quad (15)$$

It is the Newton matrix of system (13) at the final iteration. The second member of this linear system is given by the term:

$$\left[-\frac{\partial F}{\partial U^n}(\theta, U^n, U^{n+1})\frac{\partial U^n}{\partial \theta_i} - \frac{\partial F}{\partial \theta_i}(\theta, U^n, U^{n+1})\right] \quad (16)$$

The solution of this linear system (a second member per parameter) allows obtaining all the derivatives of the simulation unknowns U in relation to the desired parameterization.

By composite derivation, it is possible to express the derivatives of the main production results D in relation to the parameterization $$\frac{\partial D}{\partial \theta} = \frac{\partial D}{\partial U}\frac{\partial U}{\partial \theta} \quad (17)$$

Optimization Techniques

The non-linear optimization algorithms allow calculation, according to an iterative process, of a value $\theta^{opt}$ of parameters θ which minimizes (locally or globally) the objective function $J_1$ to be optimized.

The simulation results from the distribution $k(\theta^{opt})$ must allow better dynamic data fitting than those obtained from the initial distribution $k(\theta^{(O)})$. $\theta^{(O)}$ denotes the value of the parameters θ used to initiate the optimization process.

The objective of the iteration (k+1) of such an optimization algorithm is to determine a new estimation of parameters θ according to the following principle:

$$\theta^{(k+1)} = \theta^{(k)} + t^{(k)} s^{(k)} \qquad (18)$$

Calculation of a direction: direction $s^{(k)}$ is the solution to a certain problem linearized at $\theta^{(k)}$. The formulation of this linearized problem is based on the simulation results and on their derivatives in relation to the parameterization considered. Let:

$$D(\theta^{(k)}) \text{ and } \frac{\partial D(\theta^{(k)})}{\partial \theta} \qquad (19)$$

Linear seeking: interval $t^{(k)}$ is calculated so as to meet the descent relation:

$$J_1(\theta\text{hu }(k) + t^{(k)} s^{(k)}) < J_1(\theta^{(k)}) \qquad (20)$$

Various optimization methods are used in the petroleum industry. Examples thereof are the deepest descent method, the Fletcher-Powell method, the Levenberg-Marquardt method and the Gauss-Newton method, which are all well-known in the art.

Updating a geologic model by dynamic data is based on the combination of various methods and techniques that are discussed above. When the geostatistical model has a reasonable size, the inversion can be carried out directly thereon without using upscaling techniques. In this context, updating is carried according to the procedure illustrated in FIG. 2.

However, when the size of the geostatistical model is too large to be used directly in the flow simulator, the use of an upscaling technique becomes mandatory. The goal of upscaling is to carry out the flow simulations on a simulation model of reduced size (referred to as rough model), thus allowing obtaining of the simulation results within a reasonable time limit. In common practice, data fitting is carried out on the rough simulation model and not on the geostatistical model. The general principle of this inversion is illustrated in FIG. 3.

Unfortunately, upon convergence of the optimization process, only the simulation model is modified and it is very difficult to return to the underlying fine geostatistical model. In fact, during the inversion process, the coherence between the initial geologic model and the simulation model is not maintained. To overcome this problem, downscaling techniques have been worked out. The aim is to determine a geologic model compatible with the constrained simulation model.

These downscaling techniques are quite substantial from a numerical point of view, in particular when the geologic model is rather large in size. They do not always allow returning from the simulation scale to the geologic scale while respecting the geostatistical constraints. Furthermore, the major drawback of these techniques is that they do not guarantee that the fine geostatistical model obtained with the downscaling technique allows respecting the dynamic data (via a flow simulation on this fine model or on a simulation model after scaling).

The many publications dealing with the problem of large geologic model fitting, including notably the aforementioned publication by Wen et al. (1997), highlight the need for a new methodology for direct updating of the fine geologic model.

SUMMARY OF THE INVENTION

The method according to the invention allows updating, by the dynamic production data, a fine geologic model representative of the distribution in the reservoir of a physical quantity characteristic of the subsoil structure (the permeability or the porosity of the reservoir rocks for example).

The method provides reservoir engineers with a methodology allowing efficient updating of geologic models as dynamic data are acquired.

The method according to the invention allows direct updating, by dynamic data, of a geologic model discretized by of a fine grid pattern representative of the distribution, in an underground reservoir, of a physical quantity characteristic of the subsoil structure: the permeability (k), the porosity (Φ), etc. It comprises:

parameterization of the fine geologic model by a parameterization factor (θ) in order to obtain the distribution of the physical quantity in this geologic model upscaling so as to determine the distribution of the physical quantity in a simulation model defined by a rough grid pattern;

solution, via the simulation model, of fluid flow equations to obtain simulated dynamic data ; and determination of the analytical relations connecting variations of the simulated dynamic data and corresponding variations of parameterization factor (θ).

According to an implementation mode, the analytical relations connecting the variations of the simulated dynamic data and the corresponding variations of the parameterization factor of the fine geologic model are determined by combining the derivatives of the simulated dynamic data in relation to the parameterization factor on the scale of the simulation model and the derivatives of the parameterization factor of the simulation model in relation to the parameterization factor of the fine geologic model.

The simulation model is preferably first calibrated in order to reduce the error induced by upscaling, for example by carrying out the following operations:

an a priori fine geologic model representative of the model studied is selected (calibration model);

first simulation results compatible with this a priori model are directly determined;

a simulation model is determined by upscaling the fine geologic model;

second simulation results compatible with the simulation model formed, depending on upscaling parameters (c) and on simulation parameters (s), are directly determined;

calibration parameters (c, s) related to upscaling and simulation are adjusted so that the simulation results obtained from the a priori model and the simulation model are compatible.

The dynamic data are for example production data such as the pressure, the gas-oil ratio (GOR) or the fraction of water in oil.

According to an implementation mode, the parameterization parameter is selected by means of a gradual deformation or a pilot point technique.

According to an implementation mode, upscaling is carried out by means of an analytical method of a power average type or by means of a numerical method by solving a local or global flow problem.

In other words, the method according to the invention essentially includes two independent stages that can be used in an iterative process: a calibration stage and a fitting stage.

The goal of the calibration stage is to reduce the error induced by the upscaling procedure carried out to perform the flow simulation. Good calibration guarantees coherence between the fine geologic model (defined by a fine grid) and the simulation model in terms of flow. This is essential to allow reproduction of the fitting already obtained with the simulation model using the underlying fine geologic model or a rougher simulation model (modelled by a grid with larger grid cells) obtained after a new scaling operation. The calibration method of the invention is based on history matching techniques. The data to be fitted are no longer the dynamic data observed in the field, but the results of a reference simulation carried out on a given geologic model representative of the geostatistical model studied. Calibration is carried out using the simulation model obtained after scaling the reference geologic model.

The main objective of fitting is to constrain, by means of the dynamic data, directly the fine geologic model and not the simulation model. Direct parameterization of the fine geologic model is therefore performed. Upscaling is carried out on the geologic model after parameterization. Fitting involves, for example, calculation of the derivatives of the simulation results in relation to the parameterization on the scale of the fine geologic model. This allows a conventional optimization process to be used in order to directly update the fine geologic model.

BRIEF DESCRIPTION OF THE DRAWINGS

Other features and advantages of the method according to the invention will be clear from reading the description hereafter of a non-limitative example, with reference to the accompanying drawings wherein:

FIGS. 12A to 12E show a record of the observed bottomhole pressures, FIGS. 14A to 14E show a comparison between the calibration pressures and the simulation results before calibration, FIGS. 15A to 15E show a comparison between the calibration pressures and the simulation results after calibration, FIG. 17 shows a comparative table of the computing times which illustrates the significance of the method, FIGS. 18A to 18E show a comparison between the pressure data and the initial simulation results.

DETAILED DESCRIPTION OF THE PREFERRED EMBODIMENTS

The inversion and upscaling coupling method according to the invention comprises two independent stages which can be used in an iterative process: a fitting stage that can be advantageously completed by a prior calibration stage.

The objective of the fitting stage is to constrain, by the dynamic data directly, the fine geologic model and not the simulation model as was common practice to date. Direct parameterization of the geologic model is therefore carried out.

Figure 1:
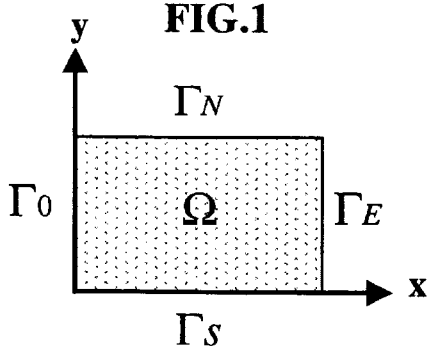
FIG. 1 shows an upscaling domain.
Figure 2:
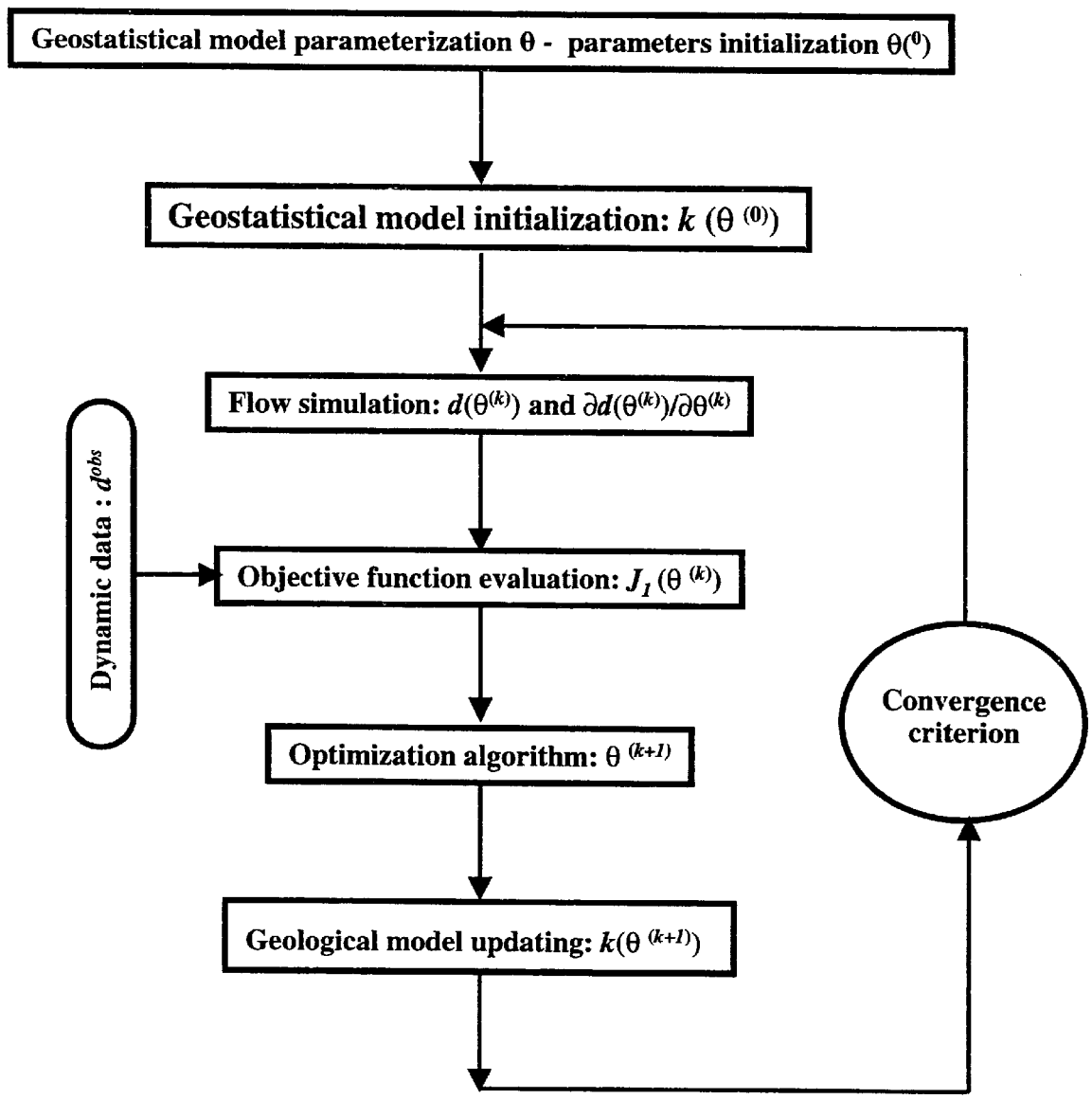
FIG. 2 shows updating of the geostatistical model by direct inversion.
Figure 3:
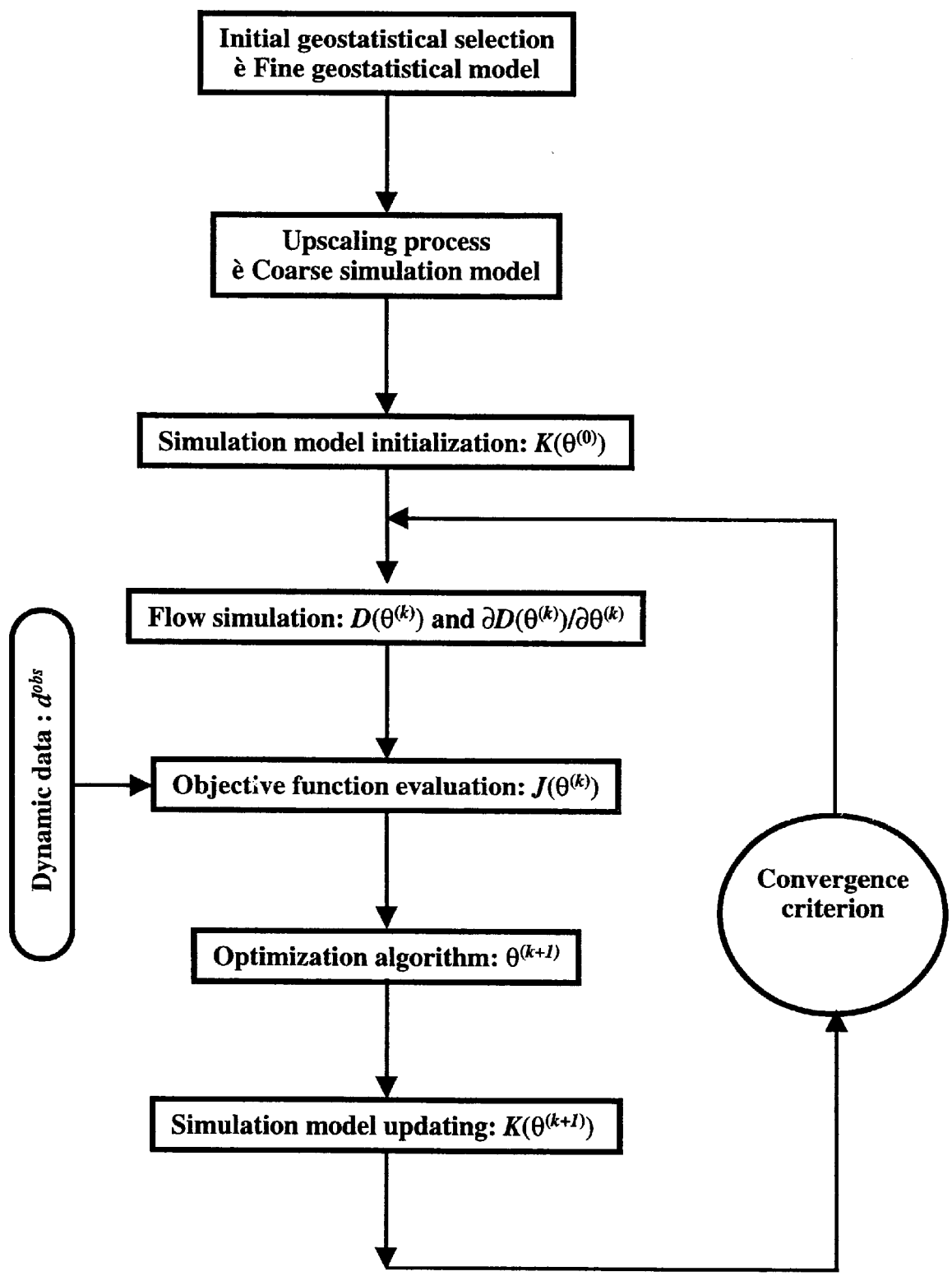
FIG. 3 shows updating of the simulation model after upscaling.
Figure 4:
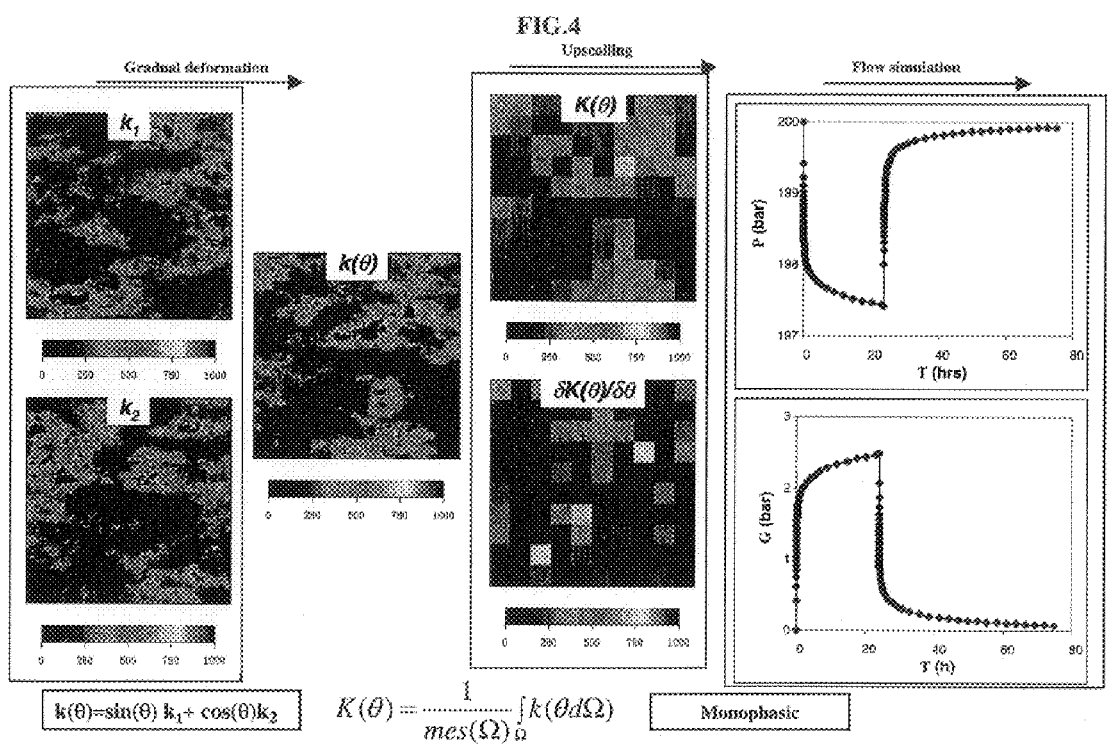
FIG. 4 shows the derivatives of the simulation results in relation to the parameterization of the geostatistical model.

Upscaling is carried out on the geologic model after parameterization (FIG. 4). This fitting stage involves calculation of the derivatives of the simulation results in relation to the parameterization on the scale of the fine geologic model. This allows a conventional optimization process to be used in order to directly update the fine geologic model.

In order to highlight the key points of the method, the fitting stage is described. The calibration stage and the iterative procedure of the methodology is described thereafter.

1—Fitting Stage: Inversion & Upscalinq Coupling

In the method, upscaling is considered to be an integral part of the parameterization operation and not a preprocessing tool for the flow simulator, so that updating is performed directly on the fine geologic model and not on the rough simulation model.

1.1—Parameterization

The new parameterization is obtained by the composition of a conventional parameterization obtained with known techniques referred to as pilot point or gradual deformation techniques, already mentioned above, with an upscaling technique (FIG. 4):

$$\theta \xrightarrow{\text{Conventional parameterization}} k(\theta) \xrightarrow{\text{Upscaling}} K(\theta) \qquad (21)$$

Direct updating of the geostatistical model by the dynamic production data requires computation of the derivatives of the simulation results in relation to the parameterization presented above. In order to be able to compute these derivatives, it is necessary first to compute the derivatives of the simulation model in relation to the parameterization (FIG. 4):

$$\theta \xrightarrow{\text{Conventional parameterization}} \frac{\partial k}{\partial \theta}(\theta) \xrightarrow{\text{Upscaling}} \frac{\partial K}{\partial \theta}(\theta) \qquad (22)$$

These derivatives are obtained by means of a composite derivation technique (FIG. 4). For each parameter $\theta_i$, the following relation is used $$\frac{\partial K_l}{\partial \theta_i}(\theta) = \sum_j \frac{\partial K_l}{\partial k_j}(\theta) \frac{\partial k_j}{\partial \theta_i}(\theta) \qquad (23)$$

1.2—Gradients method—Composite Derivation

Once all these derivatives have been calculated, it is possible to deduce the derivatives of the simulation results in relation to the parameterization from Equation 22:

$$\begin{cases} \frac{\partial U^0}{\partial \theta_i} = \frac{\partial U^{ini}}{\partial \theta_i} \\ \frac{\partial F}{\partial U^{n+1}}(\theta, U^n, U^{n+1})\frac{\partial U^{n+1}}{\partial \theta_i} + \frac{\partial F}{\partial U^n}(\theta, U^n, U^{n+1})\frac{\partial U^n}{\partial \theta_i} + \frac{\partial F}{\partial \theta_i}(\theta, U^n, U^{n+1}) = 0 \end{cases} \qquad (24)$$

with:

$$\frac{\partial F_l}{\partial \theta_i}(\theta, U^n, U^{n+1}) = \sum_j \frac{\partial F_l}{\partial K_j}(\theta, U^n, U^{n+1})\frac{\partial K_j}{\partial \theta_i}(\theta, U^n, U^{n+1}) \qquad (25)$$

The derivatives of the simulation results in relation to the parameterization is used by the inversion algorithm to compute an optimum parameter set $\theta^{opt}$ allowing better fitting of the dynamic data than the initial parameter set $\theta^{(0)}$.

Figure 5:
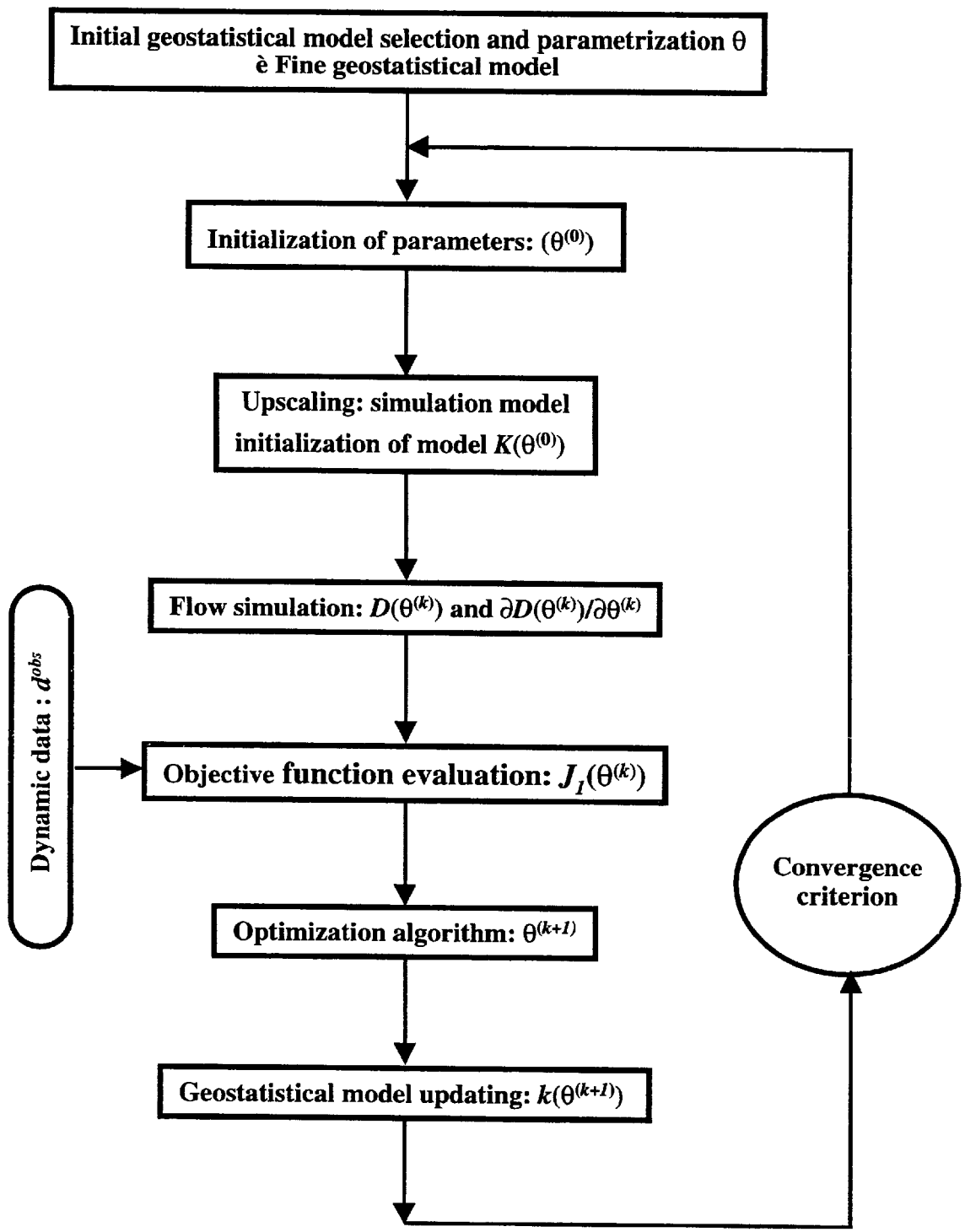
FIG. 5 shows a general diagram of the fitting stage.

The general procedure of this fitting stage is illustrated in FIG. 5.

1.3—Computer Implementation : Single-phase Context

Figure 7:
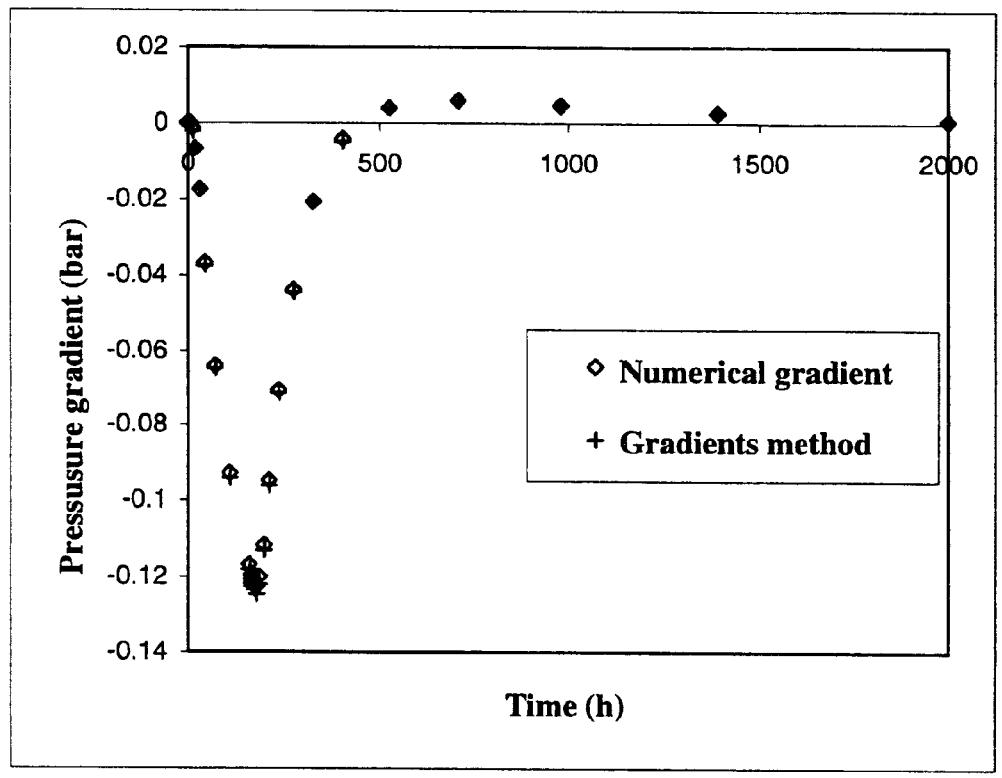
FIG. 7 shows a validation of the pressure gradient in relation to a gradual deformation parameter (observation well)

All the algorithms allowing use of the methodology according to FIGS. 5 and 7 for the calibration and fitting stages have been developed within the framework of a generalized inversion loop.

In particular, in a single-phase context, the analytical calculation of the bottomhole pressure derivatives in relation to the parameterization of the geostatistical model has been developed and integrated, in a research version, in a flow simulator. The software essentially consists of two modules: a static module for preparation of the simulation model and a dynamic module for flow simulation.

1.3.1 Static Module

The parameterization of the fine geostatistical model and the upscaling process are carried out in this module. The module provides the rough simulation model $K(\theta)$ (Equation 21) as well as its derivatives in relation to the parameterization of the geostatistical model (Equation 22). A simple illustration of this module can be summarized as follows:

Parameterization by means of the gradual deformation method (a single parameter) of the geostatistical model amounts to:

$$k(i) = \sin(\theta) k_1(i) + \cos(\theta) k_2(i) \qquad (26)$$

Upscaling with the aforementioned power average method provides the permeability distribution of the simulation model:

$$K(I) = \left( \frac{1}{n_i} \sum_{i=1}^{n_i} k(i)^w \right)^{1/w} \qquad (27)$$

Composite derivation of Equation (27) gives the derivatives of the permeabilities of the simulation model in relation to the parameterization of the geostatistical model. These derivatives are given by:

$$\frac{\partial}{\partial \theta} K(I) = \left( \frac{K(I)^{1-w}}{n_i} \sum_{i=1}^{n_i} k(i)^{w-1} \frac{\partial}{\partial \theta} k(i) \right) \qquad (28)$$

Term $$\frac{\partial}{\partial \theta} k(i)$$

results from the derivation of Equation (26):

$$\frac{\partial}{\partial \theta} k(i) = -\cos(\theta) k_1(i) + \sin(\theta) k_2(i) \qquad (29)$$

Let:

$$\frac{\partial}{\partial \theta} K(I) = \left( \frac{K(I)^{1-w}}{n_i} \sum_{i=1}^{n_i} k(i)^{w-1} (-\cos(\theta) k_1(i) + \sin(\theta) k_2(i)) \right) \qquad (30)$$

The results of Equations (27) and (30) are essential for an analytical computation of the bottomhole pressure gradients in relation to parameter $\theta$. They are stored for the dynamic module.

1.3.2 Dynamic Module

In the case of a single-phase flow of a substantially compressible fluid, a defined equation which governs the evolution of the pressure in the reservoir is given by:

$$c\phi_I V_I \frac{P_I^{(n+1)} - P_I^{(n)}}{t^{(n+1)} - t^{(n)}} - \frac{1}{\mu} \sum_{v(I)} T_{Iv(I)}(P_{v(I)}^{(n+1)} - P_I^{(n+1)}) = \sum_J \delta_{IJ} Q_J^{(n+1)} \qquad (31)$$

The transmissivity $T_{Iv(I)}$ between grid cell I and a neighboring grid cell $v(I)$ is given by:

$$T_{Iv(I)} = \frac{\alpha_1 K(I) K(v(I))}{\alpha_2 K(I) + \alpha_3 K(v(I))} \qquad (32)$$

Coefficients $\alpha_1$, $\alpha_2$ and $\alpha_3$ are functions of the geometry of grid cells I and $v(I)$.

Applying the gradients method to Equation (31) (by deriving it in relation to θ) allows calculation of the bottomhole pressure derivatives in relation to this parameter:

$$\frac{c\phi_I v_I}{t^{(n+1)} - t^{(n)}}\left(\frac{\partial P_I^{(n+1)}}{\partial \theta} - \frac{\partial P_I^{(n)}}{\partial \theta}\right) - \sum_{v(I)}\frac{T_{Iv(I)}}{\mu}\left(\frac{\partial P_{vI}^{(n+1)}}{\partial \theta} - \frac{\partial P_I^{(n+1)}}{\partial \theta}\right) = \sum_{vI}\frac{\partial T_{Iv(I)}}{\partial \theta}\left(\frac{P_{v(I)}^{(n+1)}}{\mu} - \frac{P_I^{(n+1)}}{\mu}\right) \quad (33)$$

Solution of Equation (33) requires, for each parameter θ, calculation of the corresponding second member. The results of the static module are used to calculate this second member:

$$\frac{\partial T_{Iv(I)}}{\partial \theta} = \frac{\alpha_1\alpha_2 K(I)\frac{\partial K(v(I))}{\partial \theta} + \alpha_1\alpha_2 K(v(I))\frac{\partial K(I)}{\partial \theta}}{[\alpha_2 K(I) + \alpha_3 K(v(I))]^2} \quad (34)$$

This calculation is completely explicated by using Equation (32) which allows calculation of the terms $$\frac{\partial K(v(I))}{\partial \theta} \quad \text{and} \quad \frac{\partial K(vI)}{\partial \theta}.$$

1.4 Numerical Validation

Before using the bottomhole pressure derivatives in an inversion process, a validation of this computation has first been carried out. The simplest validation test is comparing the results obtained from the gradients method as developed herein with the results obtained by numerical gradients (centered differences).

The results (FIGS. 6 and 7) are given in a form of curves showing the evolution, during an interference test, of the derivatives of pressures in a production well and an observation well in relation to the gradual deformation parameter θ.

Figure 6:
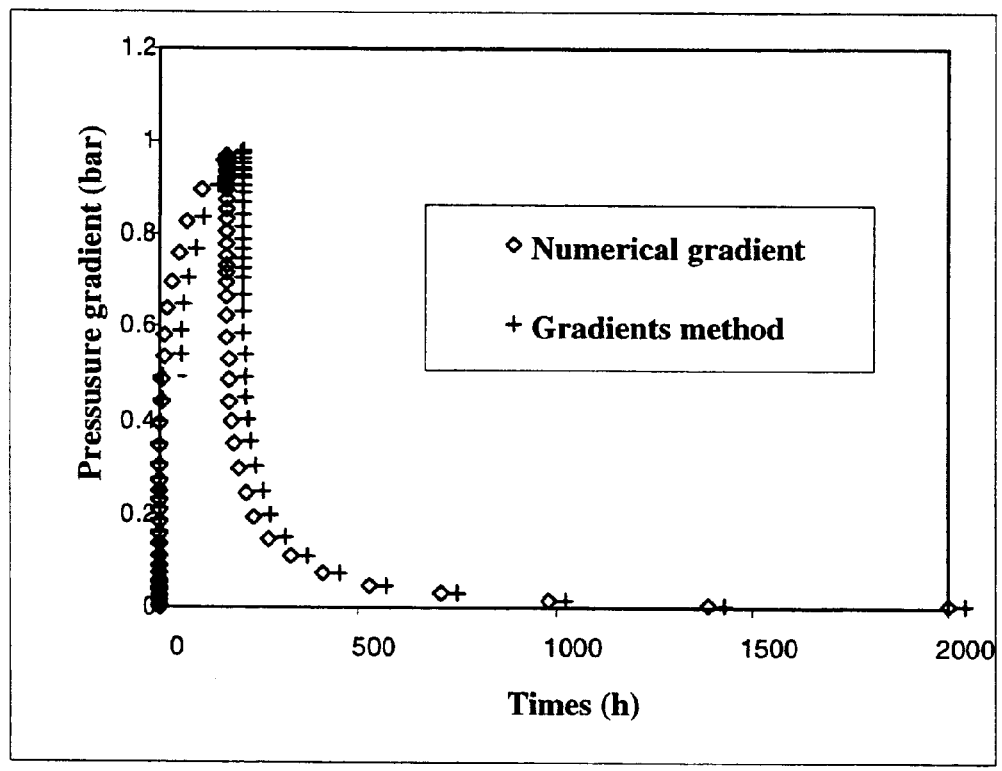
FIG. 6 shows a validation of the pressure gradient in relation to a gradual deformation parameter (production well)

FIGS. 6 and 7 allow validation of the results of the derivatives that have been developed in the flow simulator used.

2.—Calibration Stage

The aim of this calibration stage is to reduce the error induced by upscaling during flow simulation. Good calibration guarantees coherence between the geologic model and the simulation model in terms of flow. This is essential to be able to reproduce the fitting already obtained with the simulation model by using the underlying fine geologic model or a simulation model obtained after a new scaling procedure.

The calibration method is based on history matching techniques. The data to be fitted are no longer the dynamic data observed in the field but the results of a reference simulation $d^{ref}$ carried out on a given geologic model $k^{ref}$ (called the reference model) representative of the studies geostatistical model.

Calibration is carried out using the simulation model obtained after scaling the reference geologic model. Within the context of the method, two types of calibration parameters are considered:

Calibration parameters relative to the upscaling process are denoted by c. In fact, for a given upscaling technique, the simulation model depends on the various options selected for applying the technique (boundary conditions, exponent of the power average, etc.). All of these numerical data constitute the calibration parameters denoted by c, relative to the upscaling procedure. The flow simulation model will of course be a function of these calibration parameters:

$$K^{ref}(c) = F(k(\theta^{(o)})) \quad (35)$$

Calibration parameters relative to the flow simulation, are denote by s. In fact, it is conceivable to reduce the error induced by upscaling by modifying some of the parameters of the flow simulator. The goal of this modification is not to give a physical interpretation of the error induced by upscaling, but rather to minimize the consequences thereof by means of certain parameters controllable via the flow simulator.

In particular, upscaling generates a change in the numerical productivity index (IPN) of the wells. The productivity index being a function of the permeabilities:

$$IPN = \frac{2\pi h\sqrt{k_x k_y}}{\mu \ln\left(\frac{r_0}{r_w e^{-s}}\right)} \quad (36)$$

In order to correct the modification of the numerical productivity index, it is possible, in certain cases, to artificially introduce a factor referred to as skin factor whose value is determined by calibration.

In a more general context, the calibration simulation results are therefore functions of calibration parameters c and s which the reservoir engineer considers necessary to calibrate:

$$D(c,s) \quad (37)$$

After carrying out the reference simulation, it is possible to carry out the calibration parameters identification by minimizing the objective function as follows:

$$J_2(c,s) = \frac{1}{2}(d^{ref} - D(c,s))^T C_d^{-1}(d_{ref} - D(c,s)) \quad (38)$$

Figure 8:
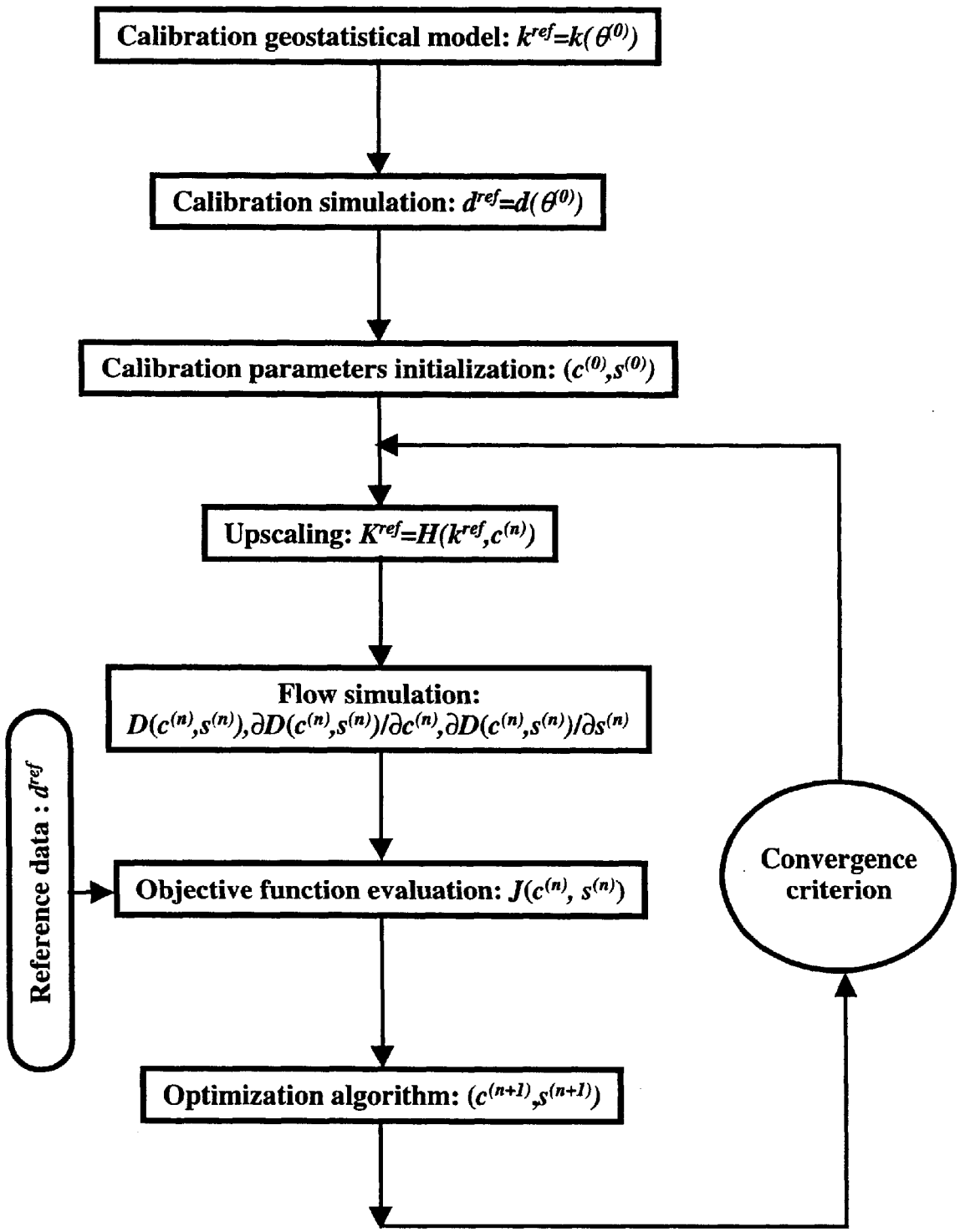
FIG. 8 shows a general diagram of the calibration stage.
Figure 9:
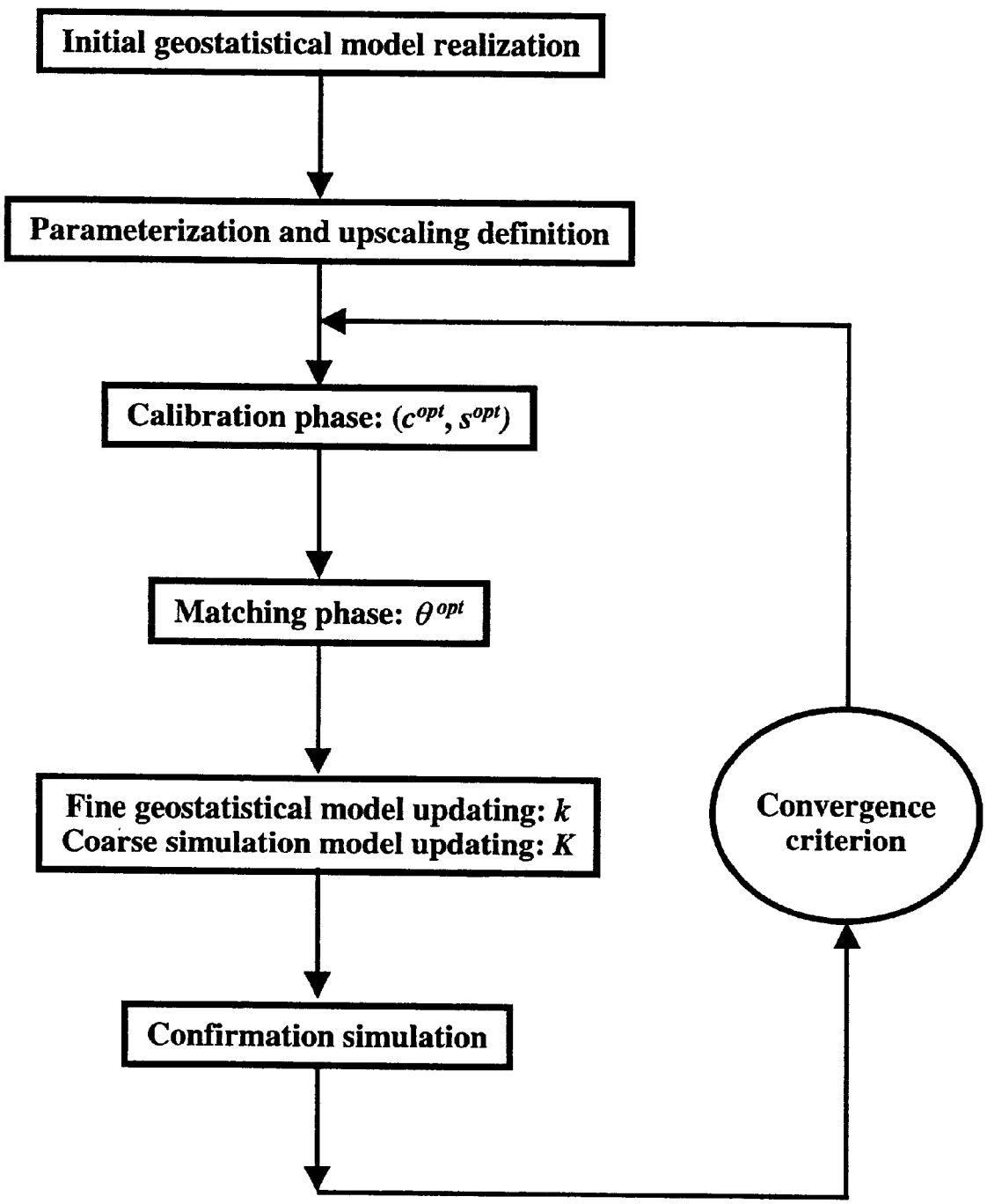
FIG. 9 shows a general diagram of the coupling methodology.

Parameters $c^{opt}$ and $s^{opt}$ resulting from this optimization are used in the fitting stage carried out after the calibration stage. The general procedure of this calibration stage is given in FIG. 8.

As mentioned above, the goal of the calibration stage is to construct a simulation model as representative as possible of the underlying geologic model. Determination of an optimum upscaling formula (c) as well as an optimum flow simulation model (s) allows reduction of the simulation error induced by the upscaling process. The calibration stage is carried out on a given geostatistical model referred to as reference model $k^{ref}$.

At the end of the fitting stage following the calibration stage, it is possible to carry out a confirmation simulation on part or all of the constrained geostatistical model so as to check the fitting quality. If the result is negative, the two calibration and fitting stages have to be repeated according to an iterative process until the convergence criteria are satisfied. The general procedure relative to this "inversion and upscaling" coupling methodology is given in FIG. 4.

3.—Validation of the Method

A synthetic interference test has been constructed to validate the use of the methodology. This synthetic test comprises a reference geostatistical model of the permeability field, assumed to be representative of a real reservoir, and synthetic pressure data produced as a result of the flow simulation of this reference model.

During integration of the pressure data, the reference geostatistical model is assumed to be unknown. Application of the methodology presented in the previous section allows construction of a geostatistical model providing fitting of the pressure data and preserving the geostatistical properties of the reference model.

3.1—Description of the Validation Case 3.1.1 General Description

The validation case is a 3D reservoir whose horizontal extension is 4020 m×4020 m for a constant 50-m thickness having the following homogeneous petrophysical properties:

Porosity: $\square$=0.3,
Horizontal anisotropy: ky/kx=1,
Vertical anisotropy: kz/kx=0.1,
Rock compressibility: c=0.0001 bar$^{-1}$,
Viscosity: $\mu$=1 cP.

The initial pressure of the reservoir is 200 bars (20 MPa) for an initial 10% water saturation. The compressibility of the water is 0.0000435 bar$^{-1}$, that of the oil is 0.000168 bar$^{-1}$. The total compressibility is 0.000255 bar$^{-1}$.

Figure 10:
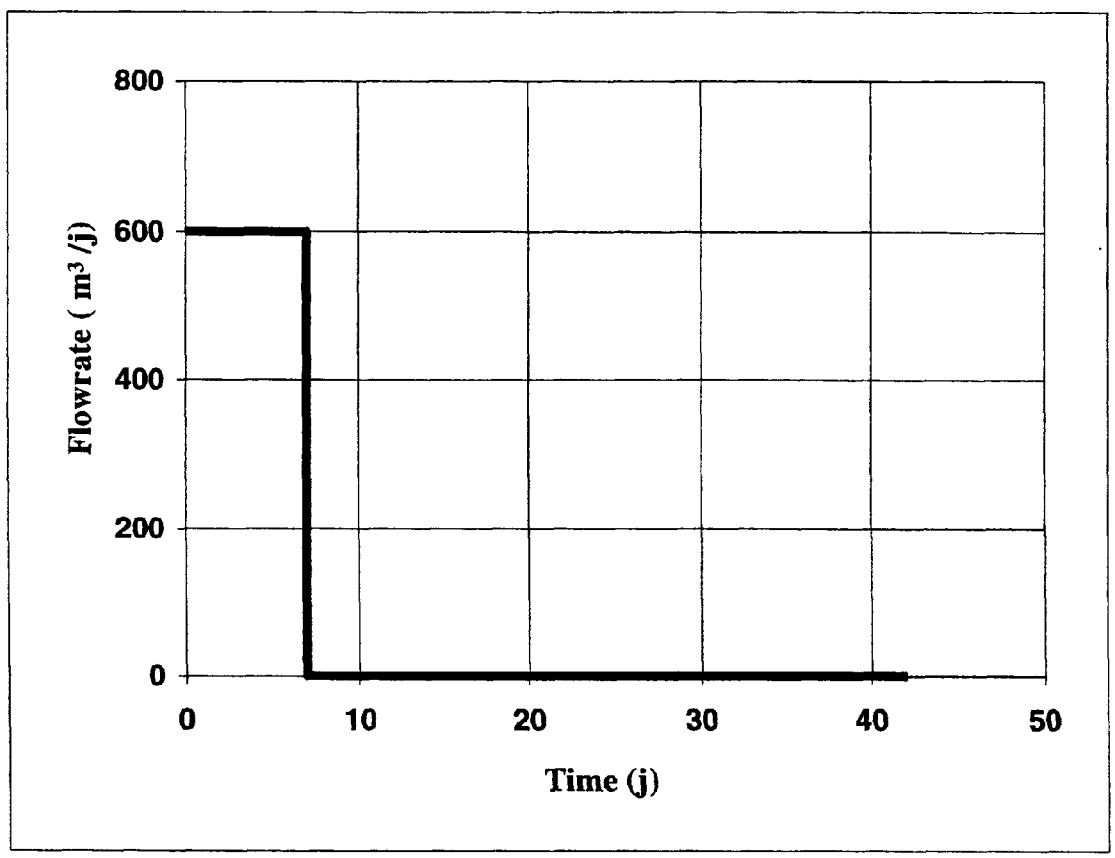
FIG. 10 shows a flow rate record.

A 7.85-cm radius vertical producing well of zero skin factor is installed at the center of the reservoir. Its flow rate history consists of a 7-day period of 600-m$^3$/day constant flow rate production, followed by a 35-day period of pressure buildup at zero flow rate (FIG. 10).

Four vertical observation wells perforated over all of the reservoir are arranged equidistant around the production well, perforated only over the first 30 meters of the reservoir.

3.1.2 Reference Geostatistical Model

The permeability of the reservoir is modelled by a random function of 300-mD average log-normal distribution and 300-mD standard deviation. This geostatistical model is completed by a spherical variogram with correlation lengths of 600 m, 300 m and 10 m along the principal anisotropy axes:

First axis: (1,1,0),
Second axis: (−1,1,0).

The third anisotropy axis is calculated so that the datum set formed by these three axes is orthonormal.

The geostatistical simulation grid is regular and consists of:

201 20-m grid cells along the x-axis,
201 20-m grid cells along the y-axis,
50 1-m grid cells alog the z-axis.

The total number of grid cells resulting from this defining is 2 020 050.

Figure 11:
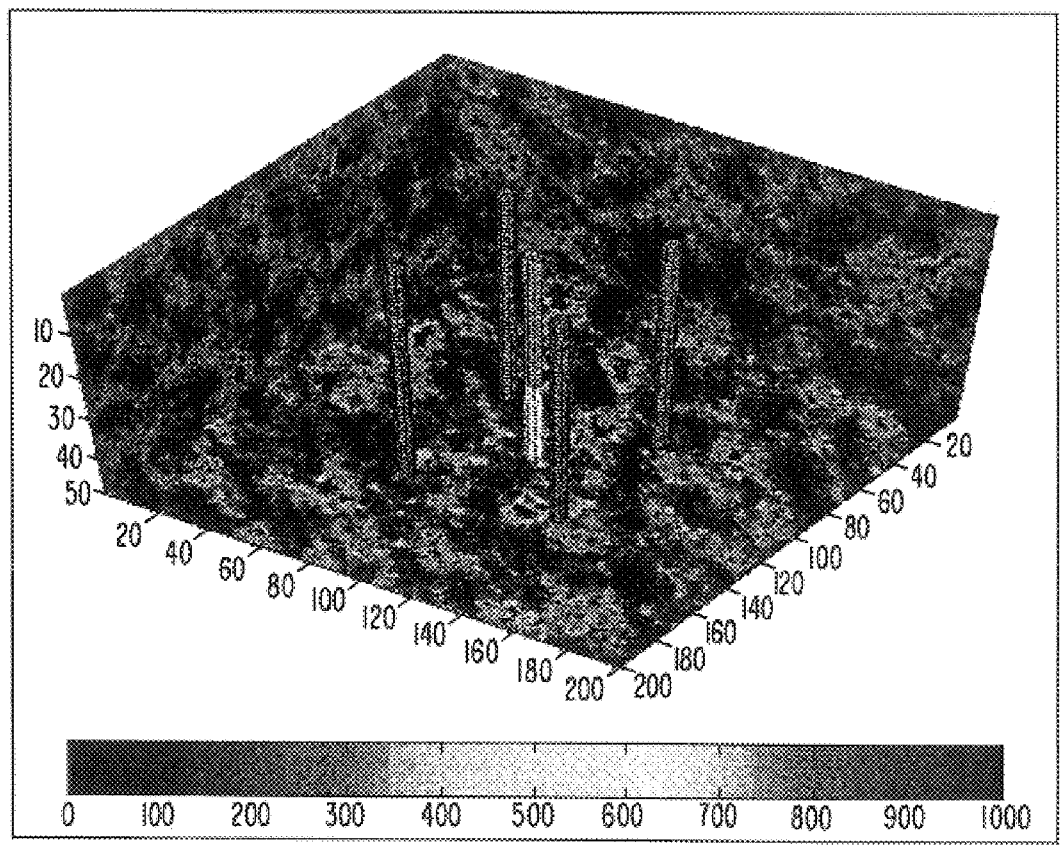
FIG. 11 shows a reference geostatistical model.

A reference geostatistical simulation of this model has been carried out in order to obtain the reference permeability field representative of the studies reservoir. This reference permeability field and the location of the wells are shown in FIG. 11.

3.1.3 Reference Synthetic Data

Figure 12C:
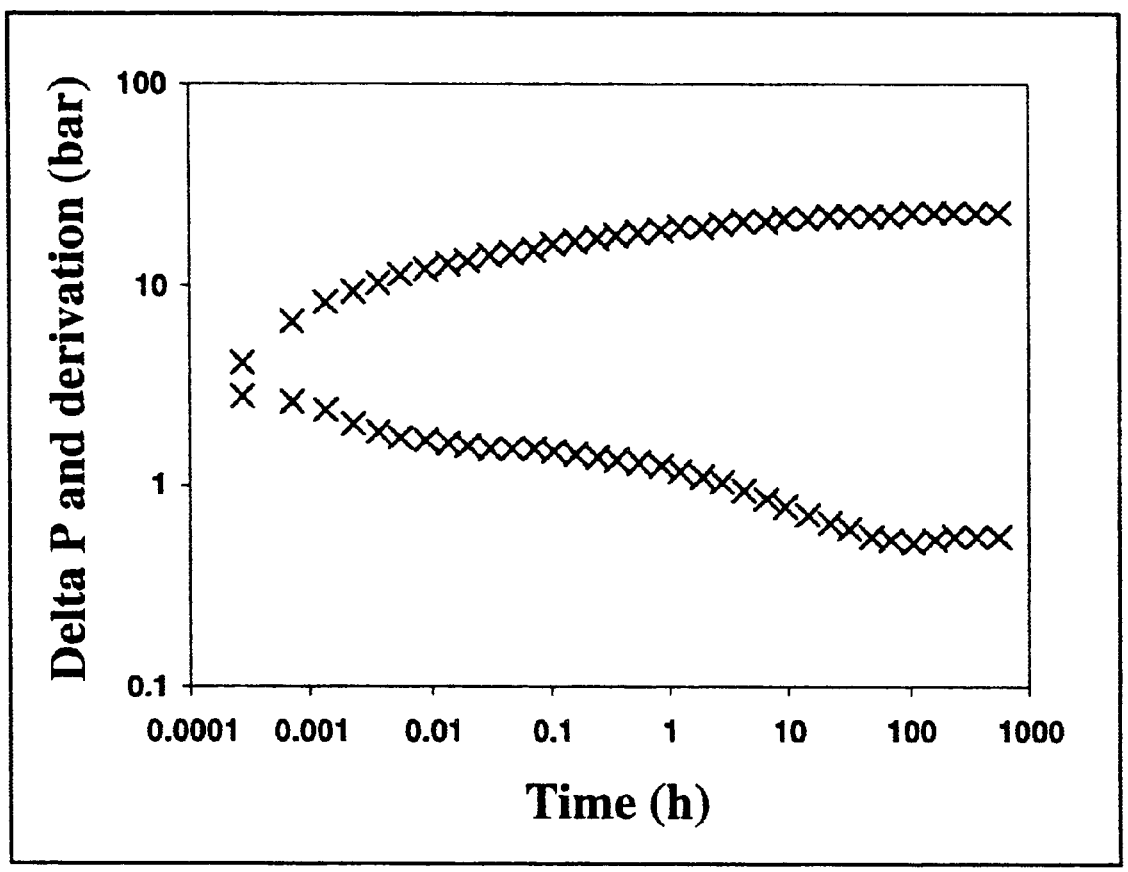

A flow simulation is carried out for a 42-day period on the reference geostatistical model. The synthetic pressure history (FIG. 12) is defined from the results of this reference simulation by the production well bottomhole pressure, its derivative in relation to time and the bottomhole pressure of the four observation wells.

The disturbance emitted in the producing well reaches the observation wells with a delay of the order of 2 days. Only the period following this delay is taken into account for the observation wells. Concerning the production well, only the pressure buildup period and its derivative in relation to time are taken into account in the formulation of the objective function.

For the inversion stage, only the characterization of the permeabilities distribution is considered. The variogram of the reference model is assumed to be completely known (principal anisotropy directions and correlation lengths).

The permeabilities of the grid cells perforated by the five wells are also assumed to be known. These permeabilities are used for conditioning the fine geostatistical model upon each iteration of the inversion process.

3.2 Initial Geostatistical Model

The reference geostatistical model is now assumed to be unknown. Starting from a new realization (initial realization), a constrained model is determined to respect both the geostatistical properties of the reference model (in terms of average, standard deviation, variogram, etc.) and the pressure data (in terms of data fitting).

Simulation of an initial geostatistical model (FIG. 13), with a random seed, allows generation of an initial permeability field respecting the geostatistical properties of the reference model. However, this initial model does not allow the pressure data to be respected. In order to constrain the geostatistical model by the pressure data, the methodology presented in the previous section is applied to the initial realization.

3.3 Pressure Data Fitting

Integration of the pressure data in the initial geostatistical model has been carried out using:

the power average method for the upscaling stage;
the gradual deformation method for parameterization of the geostatistical model.

In order to best reproduce the bottomhole permeability values, integrated in the geostatistical model via a kriging stage, upscaling has not been carried out on the well grid cells (for each layer). The rough simulation model thus obtained consists of:

43 grid cells along the x-axis,
43 grid cells along the y-axis,
10 grid cells along the z-axis.

The total number of grid cells is thus 18 490, i.e. a reduction by more than 99% of the number of grid cells in relation to the geostatistical model. A reduction in the flow simulation time results from this reduction in the number of grid cells. Thus, the flow simulation on the geostatistical grid is of the order of 180 minutes against 3 minutes only on the rough grid (10–440 MHz SUN ULTRA station), that is a reduction of about 99%. A more global quantification of the (CPU time) gains provided by the methodology is presented in the next section.

As regards the gradual deformation method, a single deformation chain containing six realizations independent of the geostatistical model has been used.

3.3.1 Calibration Stage

Figure 13:
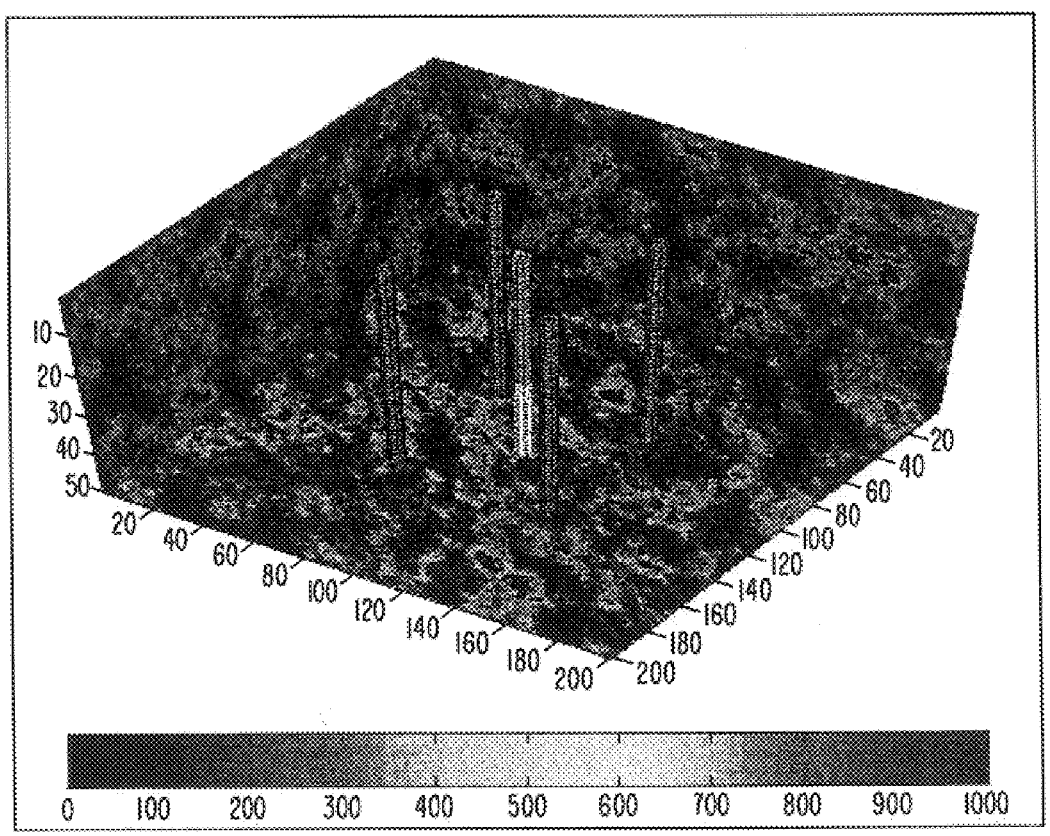
FIG. 13 shows an initial geostatistical model.

During this calibration stage, reduction of the difference between the simulation results on the fine and on the rough grid for the initial geostatistical model (FIG. 13). The calibration parameters selected are:

skin factor s for producing well P1;

exponent w of the upscaling formula.

Figure 14A:
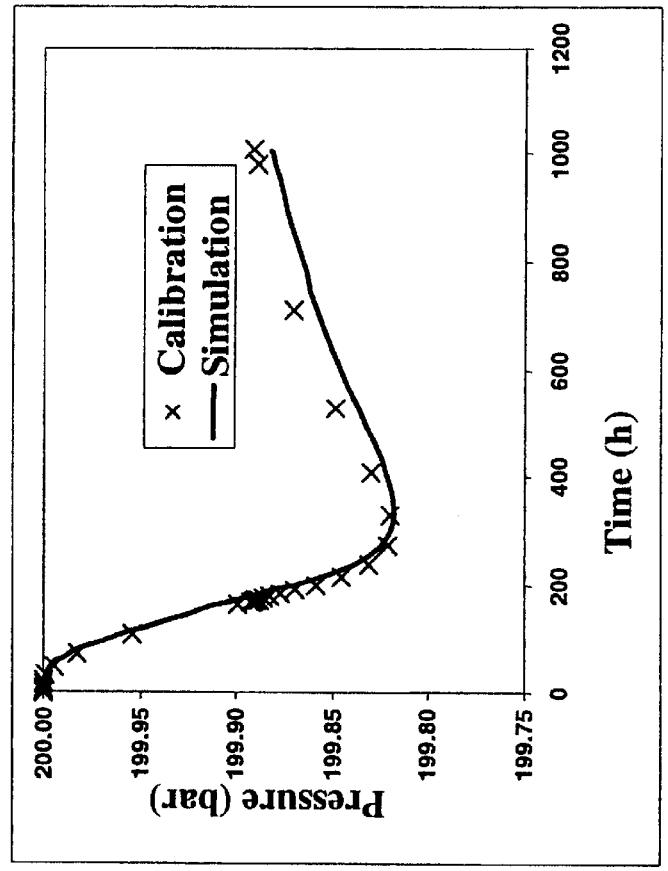
Figure 14B:
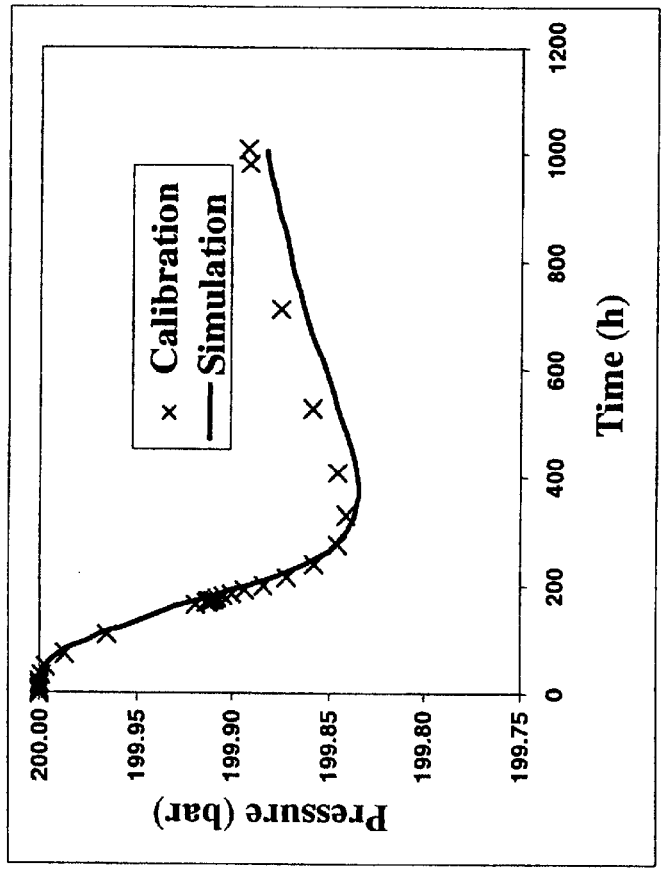
Figure 14C:
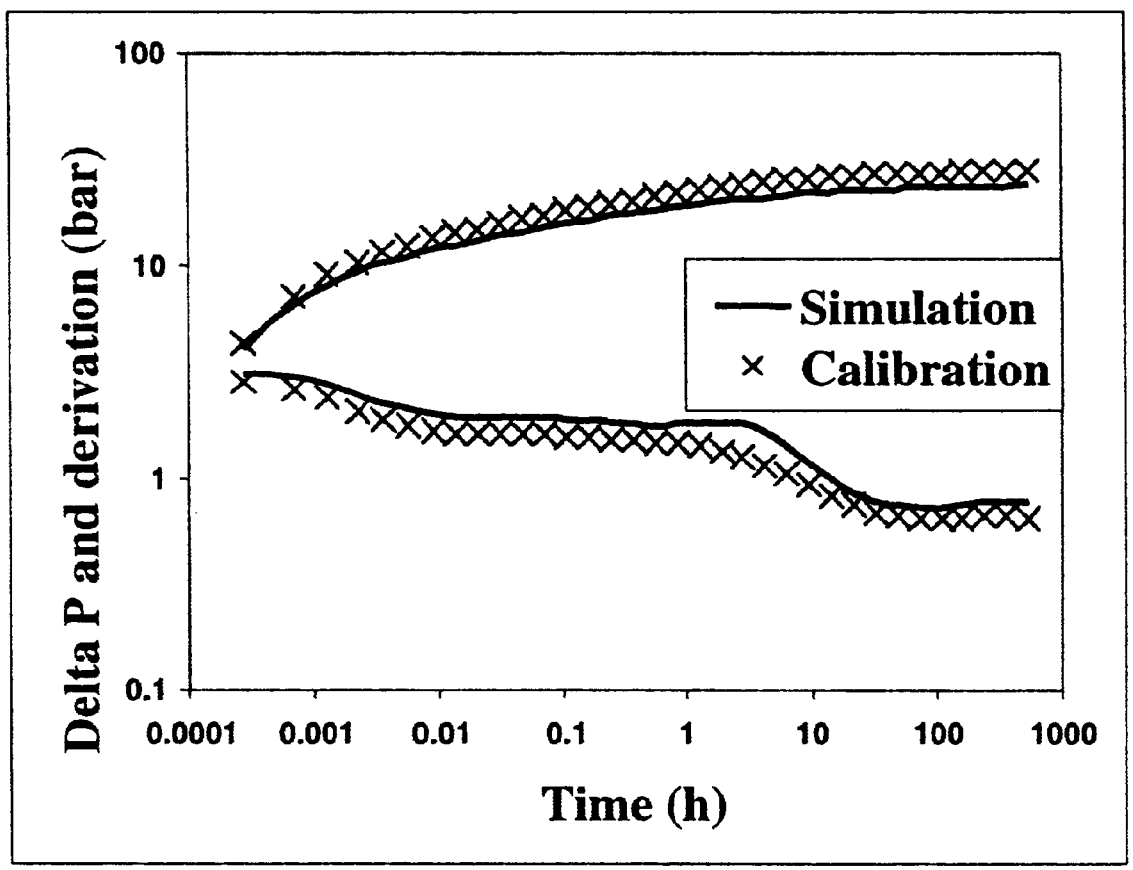

In fact, there is a slight discrepancy between the results of the simulation carried out on the rough grid after upscaling using a harmonic mean (w=−1) and a zero skin factor in the producing well (the value of the physical skin factor) and those obtained on the fine grid (FIG. 14). This discrepancy corresponds to a value of 195 of the objective function.

Figure 15C:
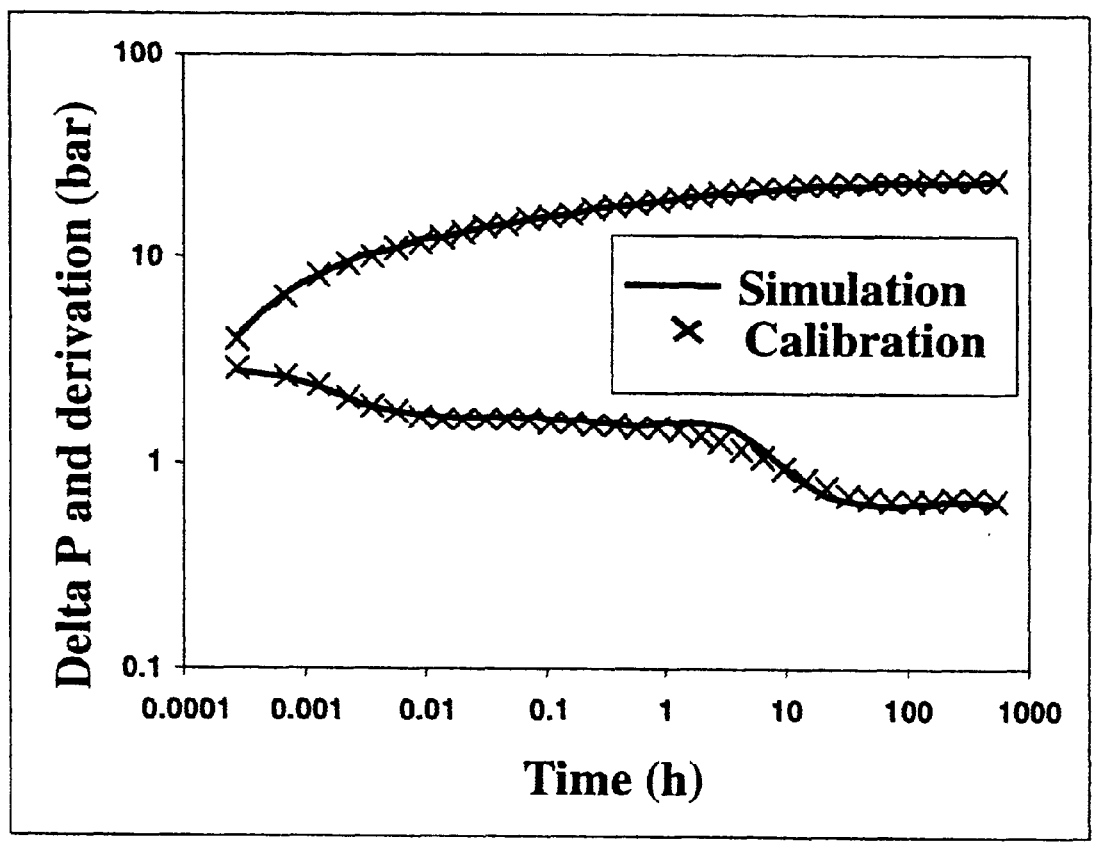
Figure 15E:
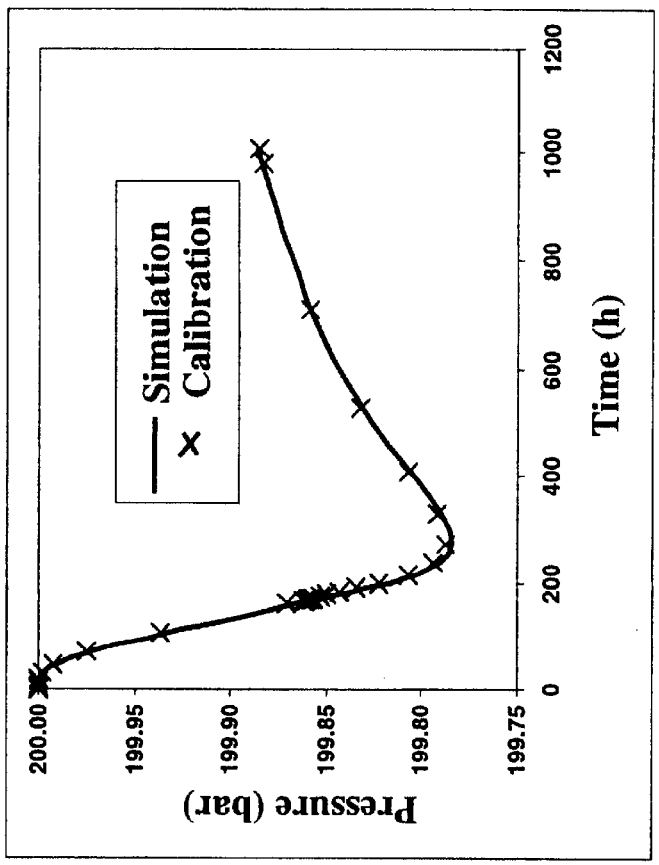
Figure 15D:
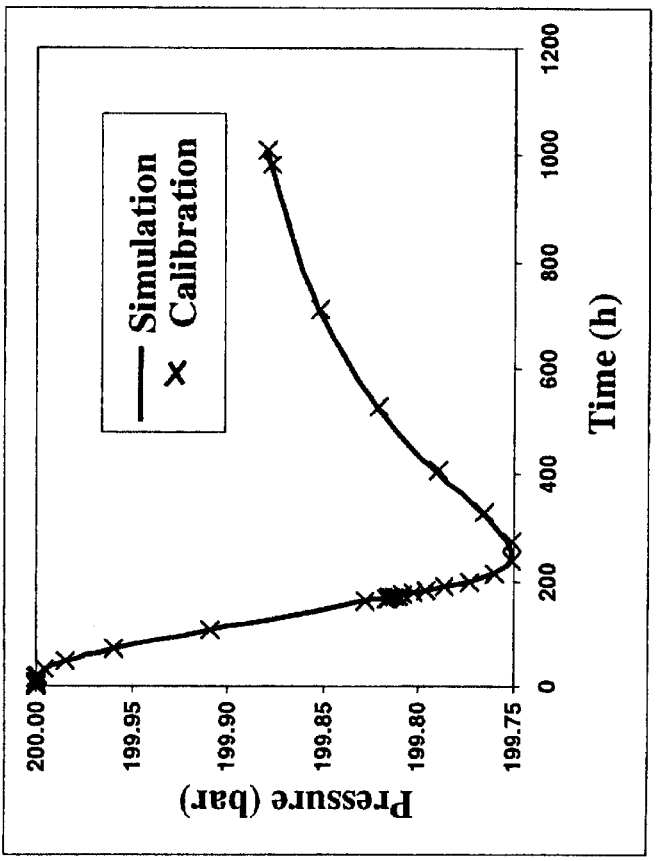

During the calibration procedure, it has been possible to reduce this difference by modifying calibration parameters (s,w). Thus, by selecting an arithmetic mean for the upscaling stage (w=+1) and by introducing an artificial skin factor of −0.04, the simulation results for the rough grid after calibration are perfectly in accordance with those obtained for the fine grid (FIG. 15). The value of the objective function is then 10 after 5 iterations.

For this test case, the calibrated value of exponent w of the upscaling formula (w=+1) is a known result. However, this exponent was deliberately initialized at value −1 in order to validate the robustness of the calibration stage.

3.3.2 Fitting Stage

Once the calibration stage is completed, it is possible to carry out the integration of the pressure data in the initial geostatistical model. In fact, a discrepancy remains between the simulation results obtained for the rough grid, considering the calibration stage (w=+1, s=−0.004), and the pressure data (FIG. 17).

The objective function corresponding to this initial simulation is of the order of 112. In order to reduce this objective function, a gradual deformation chain including six realizations independent of the geostatistical model has been constructed:

$$k(\theta) = \sum_{i=1}^{n} \theta_i k_i \qquad (39)$$

Figure 16:
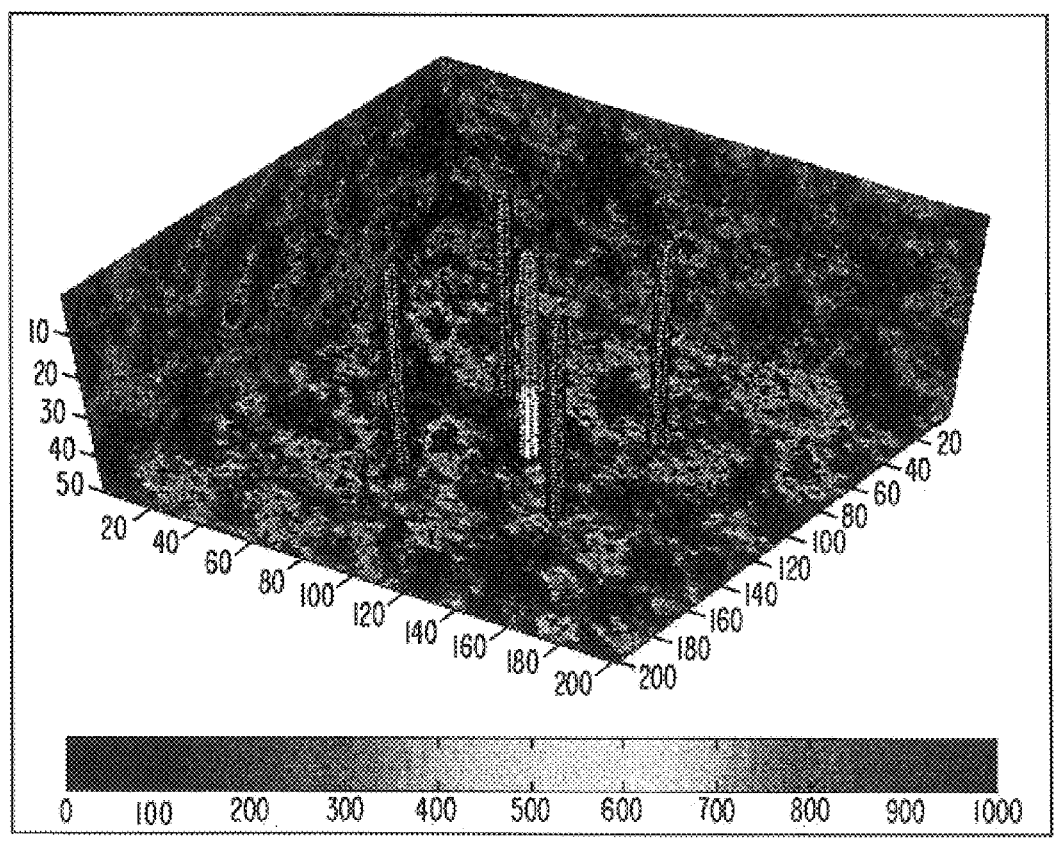
FIG. 16 shows a constrained geostatistical model.

The constrained geostatistical model (FIG. 16) has been obtained after 21 iterations with an objective function equal to 7.5.

Figure 18C:
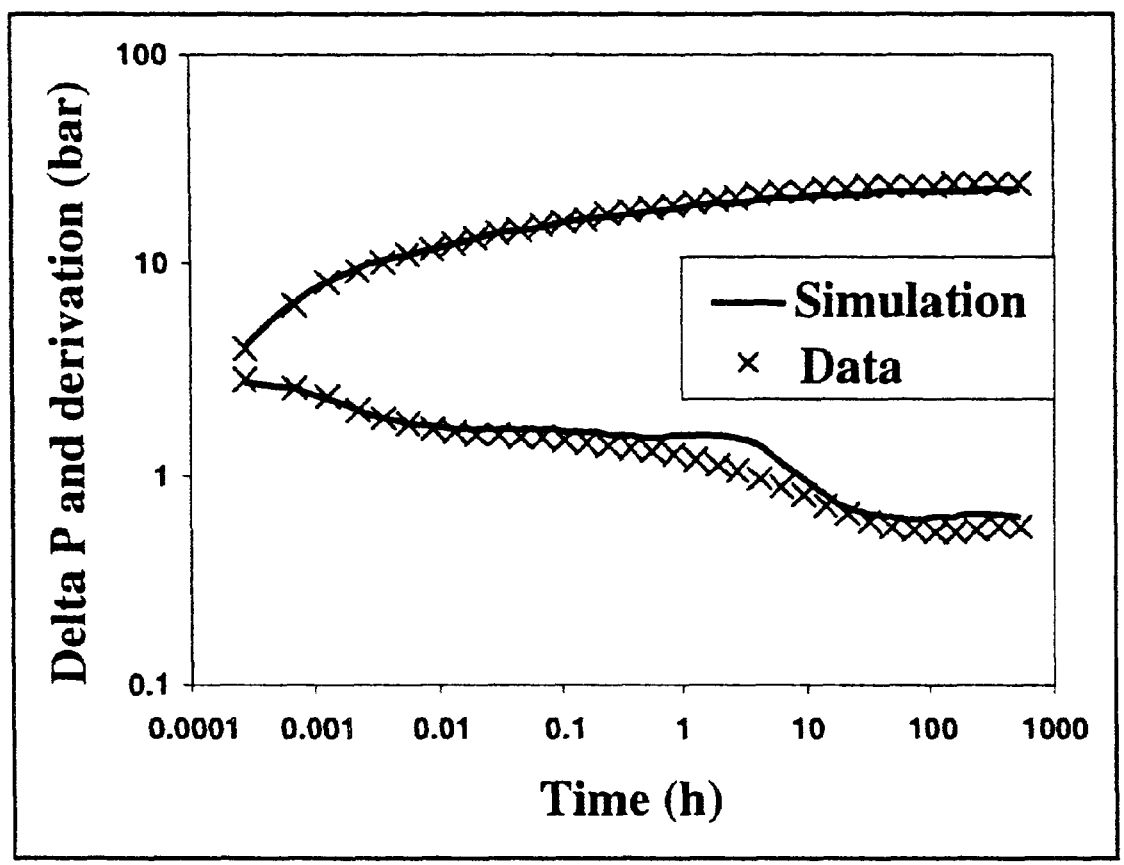
Figure 19A:
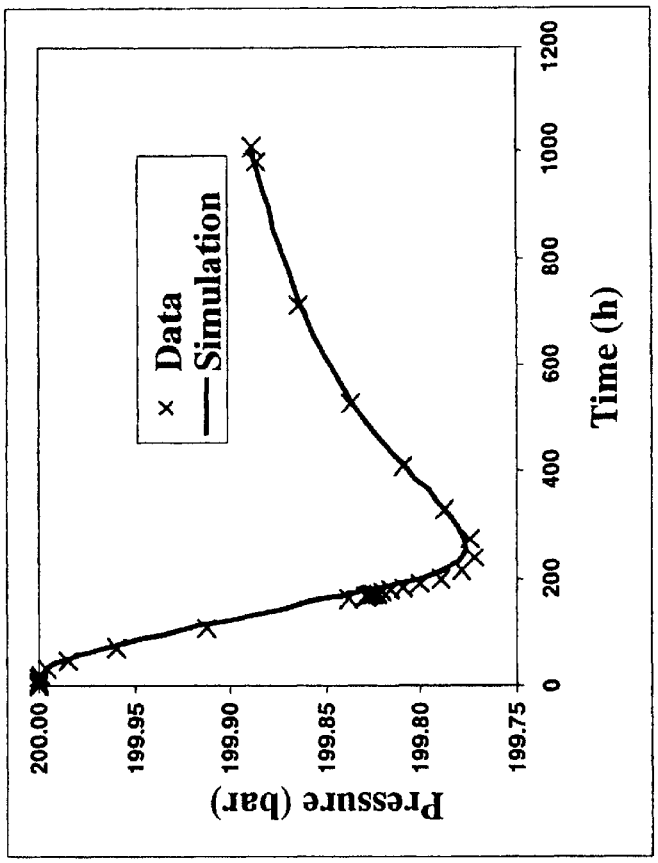
FIGS. 19A to 19E show a comparison between the pressure data and the simulation results after fitting.
Figure 19B:
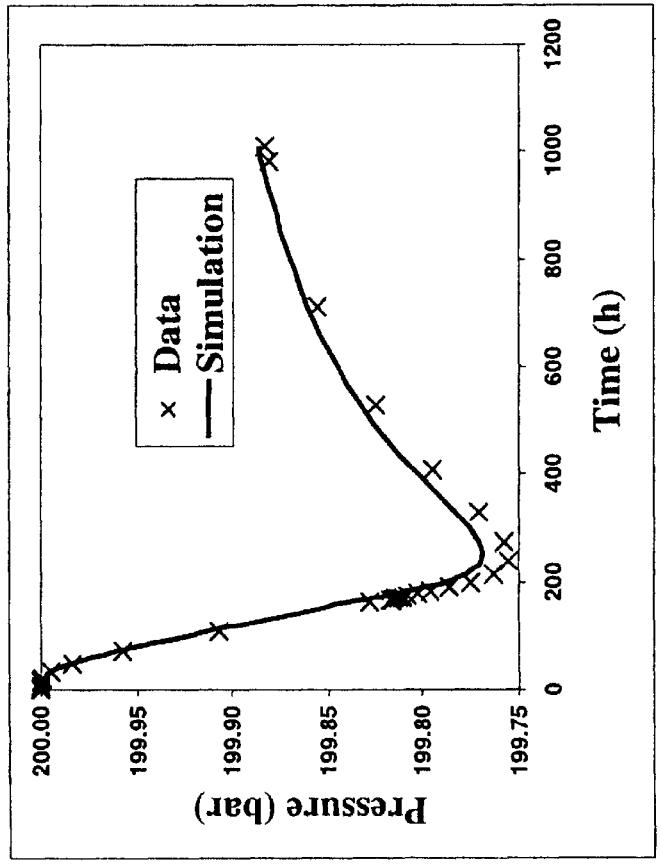
Figure 19C:
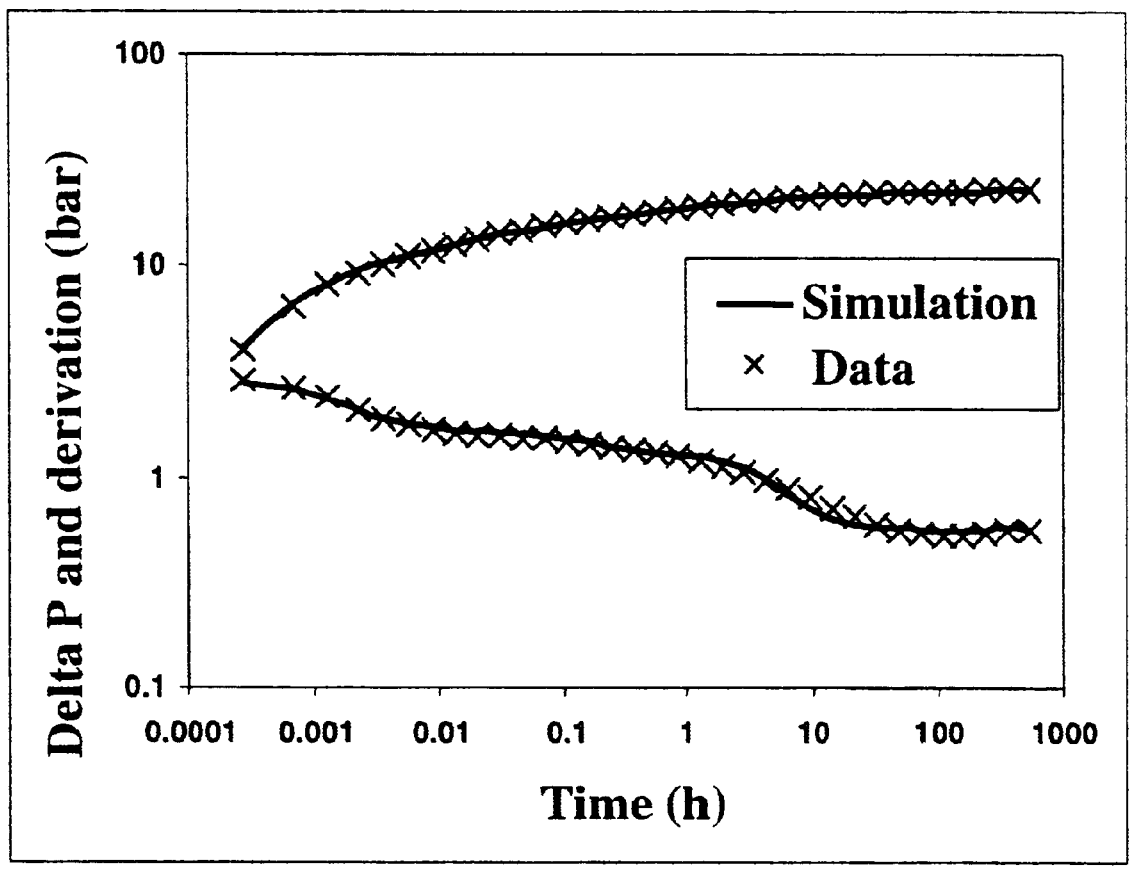
Figures 19D, 19E:
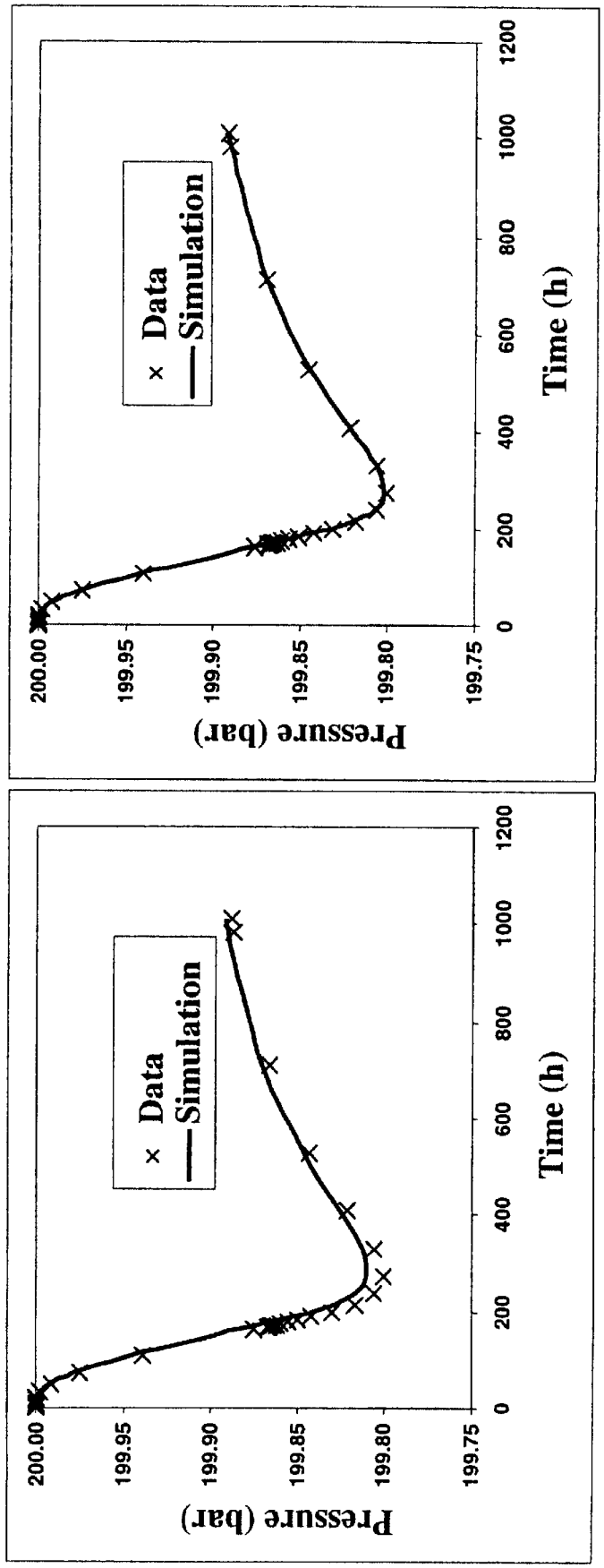
Figure 20A:
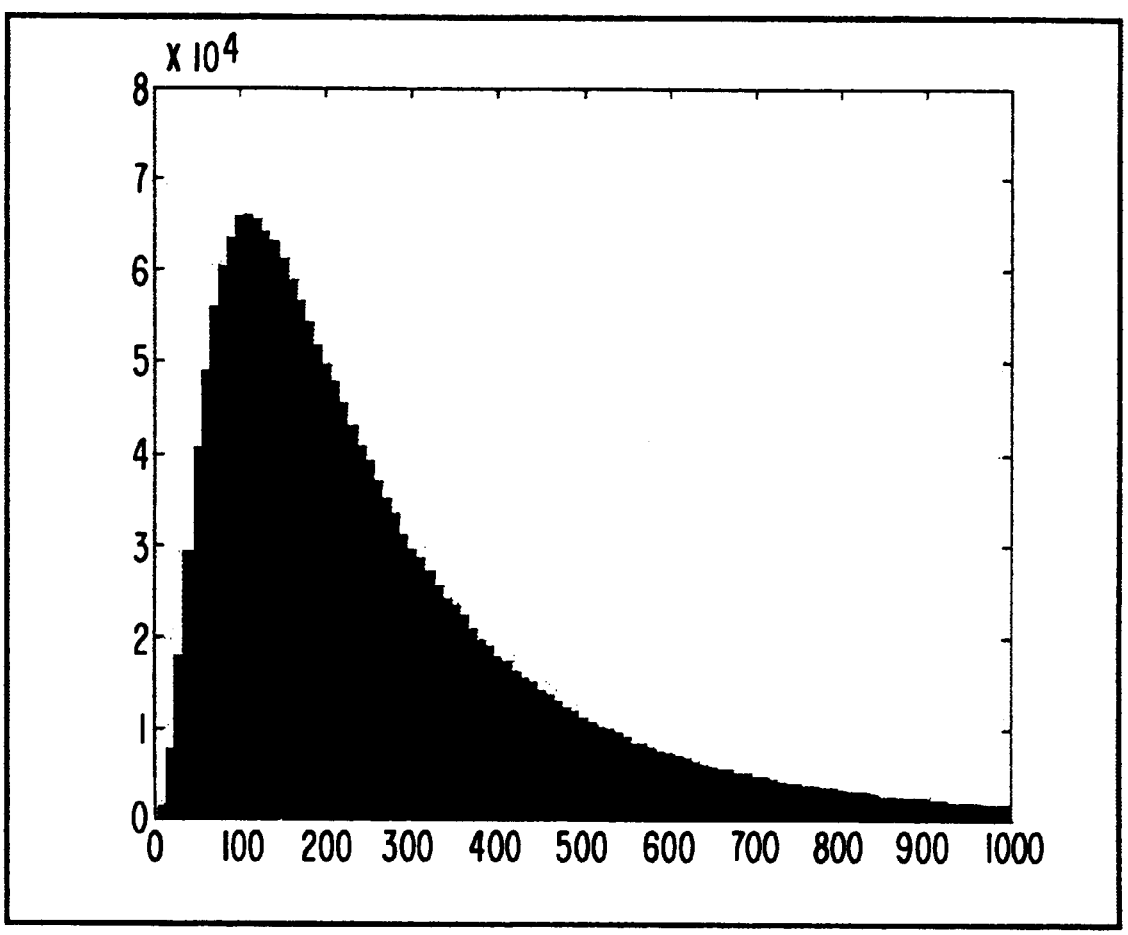
FIGS. 20A to 20C show bar graphs of the reference, initial and constrained geostatistical models respectively.
Figure 20B:
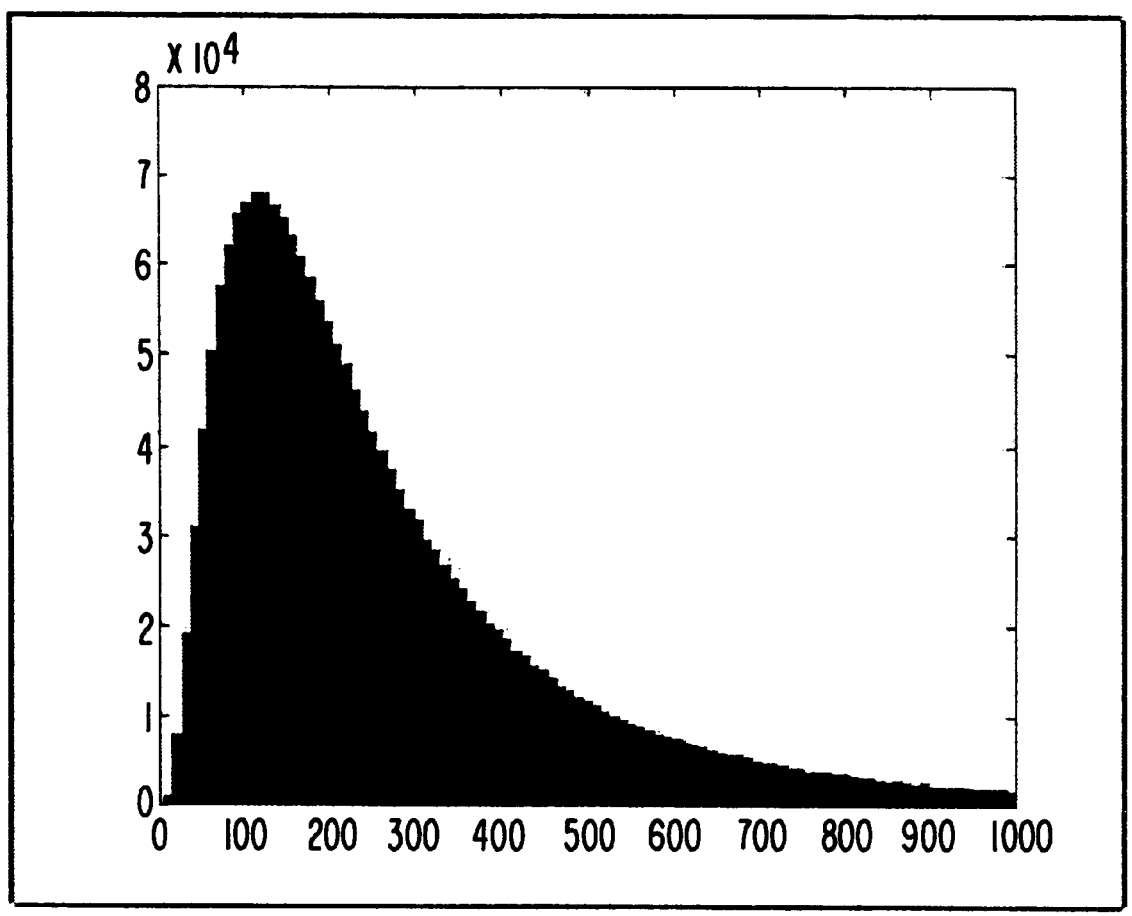
Figure 20C:
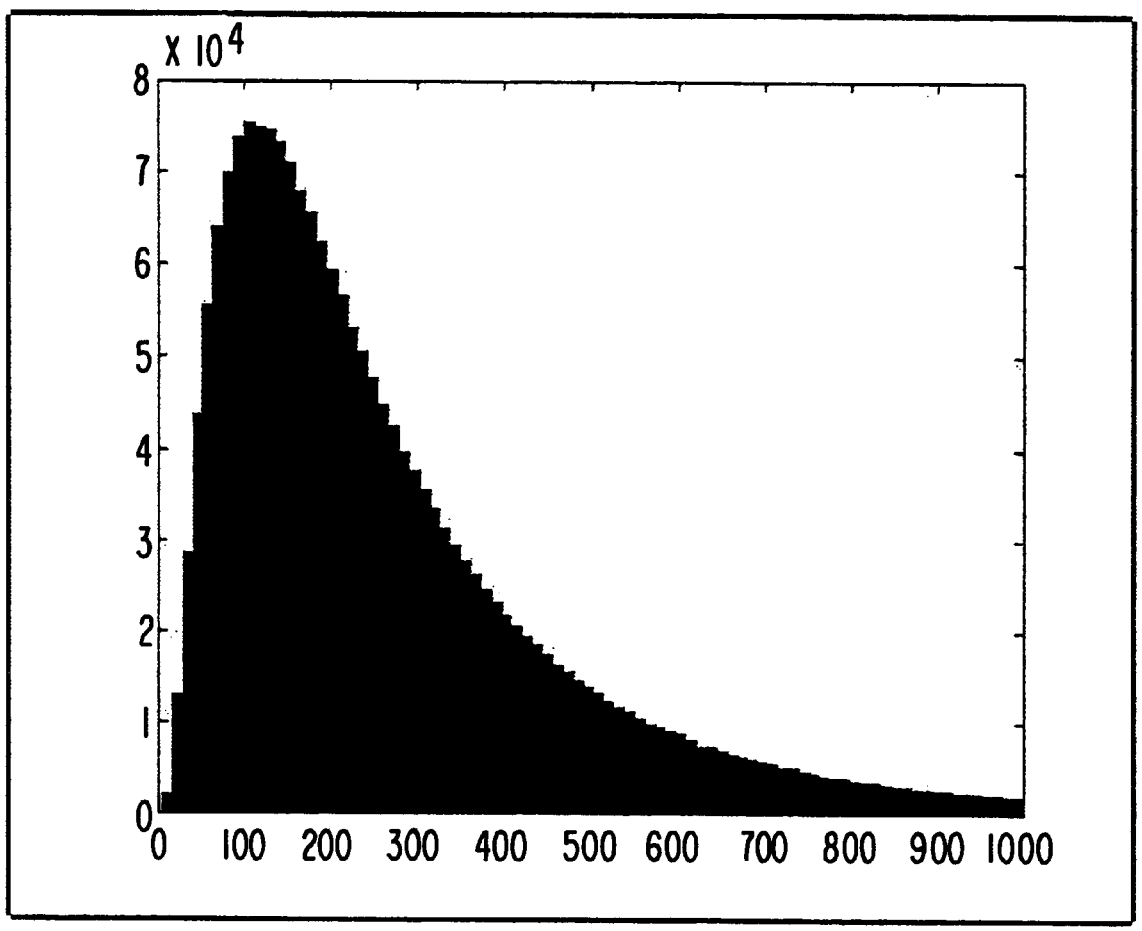

This constrained geostatistical model allows very good fitting of the pressure data, as shown in FIG. 18. Thus, the constrained geostatistical model allows respecting not only the pressure data, but also the geostatistical properties of the model. In particular, the experimental bar graphs corresponding to the reference, initial and constrained models are in accordance (FIG. 19).

3.3.3 Global Appraisal of the CPU Time Gains

In the test case presented in the previous section, about 10 CPU hours were necessary for data fitting. Updating of the geostatistical model without upscaling would have been much costlier in time since an a priori estimation of the CPU time required by such an approach is of the order of 378 hours. This CPU time is divided between the flow simulation and the computation of the gradients of the simulation results in relation to the various fitting and calibration parameters. A more detailed description of the CPU time distribution is given in Table 1.

It can thus be seen that the method according to the invention allows direct, coherent and fast updating of the geostatistical model. Direct parameterization of the fine geostatistical model, instead of that of the rough simulation model, and calculation of the simulation result gradients in relation to this paramerization have allowed direct updating of the geostatistical model in an iterative optimization process. Parameterization of the geostatistical model by the gradual deformation method allows to keep, during this iterative process, the global geostatistical properties of the model. The coherence of the constrained geostatistical model resulting from the iterative process is thus ensured. Coupling of the upscaling and inversion techniques allows considerable reduction of the CPU time required for integration of the pressure data in the geostatistical model.

The validation tests carried out in a single-phase context have shown the power of the proposed method for updating large geologic models by dynamic data.

The absolute permeability has been used here by way of example as the physical quantity characteristic of the subsoil structure. This is of course not limitative. The method according to the invention for integration of the dynamic data in large geologic models remains however applicable for other physical quantities, notably the porosity of the medium considered.

What is claimed is:

1. A method for direct updating, by dynamic data, a fine geological model discretized by a fine grid pattern representative of a distribution, in an underground reservoir, of a physical quantity characteristic of subsoil structure comprising:

processing the fine geological model by a parameterization factor in order to obtain a parameterized geological model including a distribution of a physical quantity in the fine geological model;

upscaling the parameterized geological model so as to determine a distribution of the physical quantity in a simulation model discretized by a coarser grid pattern which is less detailed than the fine geological pattern;

solving by use of the simulation model, fluid flow equations to obtain simulated dynamic data; and determining analytical relations connecting variations of the simulated dynamic data and corresponding variations of the parameterization factor thereby forming updated geological model corresponding to the parameterization factor and matching dynamic data.

2. A method as claimed in claim 1 comprising:

determining analytical relations connecting variations of the simulated dynamic data and the corresponding variations of the parameterization factor of the fine geological model by combining derivatives of the simulated dynamic data in relation to the parameterization factor on a scale of the simulation model and derivatives of the parameterization factor of the simulation model in relation to the parameterization factor of the fine geologic model.

3. A method as claimed in claim 1 wherein:

calibration of the simulation model is first performed in order to reduce an error induced by the upscaling.

4. A method as claimed in claim 2 wherein:

calibration of the simulation model is first performed in order to reduce an error indicated by the upscaling.

5. A method as claimed in claim 1 wherein the calibration comprises:

selecting an a priori geological model representative of the fine geological model;

directly determining first simulation results compatible with the a priori geological model;

determining the simulation results compatible with the a priori geological model;

directly determining second simulation results, compatible with the simulation model, dependent on upscaling parameters and on simulation parameters; and adjusting the upscaling and simulation parameters so that the simulation results obtained from the a priori geological model and the simulation model are compatible.

6. A method as claimed in claim 2 wherein the calibration comprises the following operations:
selecting an a priori geological model representative of the fine geological model;
directly determining first simulation results compatible with the a priori geological model;
determining the simulation results compatible with the a priori geological model;
directly determining second simulation results, compatible with the simulation model, dependent on upscaling parameters and on simulation parameters; and
adjusting the upscaling and simulation parameters so that the simulation results obtained from the a priori geological model and the simulation model are compatible.

7. A method as claimed in claim 3 wherein the calibration comprises:
selecting an a priori geological model representative of the fine geological model;
directly determining first simulation results compatible with the a priori geological model;
determining the simulation results compatible with the a priori geological model;
directly determining second simulation results, compatible with the simulation model, dependent on upscaling parameters and on simulation parameters; and
adjusting the upscaling and simulation parameters so that the simulation results obtained from the a priori geological model and the simulation model are compatible.

8. A method as claimed in claim 4 wherein the calibration comprises:
selecting an a priori geological model representative of the fine geological model;
directly determining first simulation results compatible with the a priori geological model;
determining the simulation results compatible with the a priori geological model;
directly determining second simulation results, compatible with the simulation model, dependent on upscaling parameters and on simulation parameters; and
adjusting the upscaling and simulation parameters so that the simulation results obtained from the a priori geological model and the simulation model are compatible.

9. A method as claimed in claim 1 wherein:
the physical quantity is one of permeability or porosity rocks of the underground reservoir.

10. A method as claimed in claim 2 wherein:
the physical quantity is one of permeability or porosity rocks of the underground reservoir.

11. A method as claimed in claim 3 wherein:
the physical quantity is one of permeability or porosity rocks of the underground reservoir.

12. A method as claimed in claim 5 wherein:
the physical quantity is one of permeability or porosity rocks of the underground reservoir.

13. A method as recited in claim 1 wherein:
the dynamic data are production data.

14. A method as recited in claim 2 wherein:
the production data comprises one of pressure, gain-oil ratio or a fraction of water in oil.

15. A method as recited in claim 3 wherein:
the dynamic data are production data.

16. A method as recited in claim 5 wherein:
the dynamic data are production data.

17. A method as recited in claim 9 wherein:
the dynamic data are production data.

18. A method as claimed in claim 1 wherein:
selection of the parameterization factor is carried out by means of one of a gradual deformation or a pilot point technique.

19. A method as claimed in claim 2 wherein:
selection of the parameterization factor is carried out by means of one of a gradual deformation or a pilot point technique.

20. A method as claimed in claim 3 wherein:
selection of the parameterization factor is carried out by means of one of a gradual deformation or a pilot point technique.

21. A method as claimed in claim 5 wherein:
selection of the parameterization factor is carried out by means of one of a gradual deformation or a pilot point technique.

22. A method as claimed in claim 9 wherein:
selection of the parameterization factor is carried out by means of one of a gradual deformation or a pilot point technique.

23. A method as claimed in claim 13 wherein:
selection of the parameterization factor is carried out by means of one of a gradual deformation or a pilot point technique.

24. A method as claimed in claim 1 wherein:
the upscaling is carried out by an analytical method of a power average type.

25. A method as claimed in claim 2 wherein:
the upscaling is carried out by an analytical method of a power average type.

26. A method as claimed in claim 3 wherein:
the upscaling is carried out by an analytical method of a power average type.

27. A method as claimed in claim 5 wherein:
the upscaling is carried out by an analytical method of a power average type.

28. A method as claimed in claim 9 wherein:
the upscaling is carried out by an analytical method of a power average type.

29. A method as claimed in claim 13 wherein:
the upscaling is carried out by an analytical method of a power average type.

30. A method as claimed in claim 18 wherein:
the upscaling is carried out by an analytical method of a power average type.

31. A method as claimed in claim 1 wherein:
the upscaling is carried out by a numerical method by solution of a local or global flow problem.

32. A method as claimed in claim 2 wherein:
the upscaling is carried out by a numerical method by solution of a local or global flow problem.

33. A method as claimed in claim 3 wherein:
the upscaling is carried out by a numerical method by solution of a local or global flow problem.

34. A method as claimed in claim 5 wherein:
the upscaling is carried out by a numerical method by solution of a local or global flow problem.

35. A method as claimed in claim 9 wherein:
the upscaling is carried out by a numerical method by solution of a local or global flow problem.

36. A method as claimed in claim 13 wherein:
the upscaling is carried out by a numerical method by solution of a local or global flow problem.

37. A method as claimed in claim 18 wherein:
the upscaling is carried out by a numerical method by solution of a local or global flow problem.

* * * * *